United States Patent
Iwasaki et al.

(10) Patent No.: US 11,716,536 B2
(45) Date of Patent: Aug. 1, 2023

(54) CONTROL DEVICE, IMAGE CAPTURING APPARATUS, AND CONTROL METHOD FOR DETECTING OBSTACLE

(71) Applicant: CANON KABUSHIKI KAISHA, Tokyo (JP)

(72) Inventors: Naoki Iwasaki, Kanagawa (JP); Yu Inagaki, Tokyo (JP); Kuniaki Sugitani, Kanagawa (JP); Maiko Takao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/233,180

(22) Filed: Apr. 16, 2021

(65) Prior Publication Data

US 2021/0337129 A1 Oct. 28, 2021

(30) Foreign Application Priority Data

Apr. 22, 2020 (JP) .................................. 2020-076086
Feb. 17, 2021 (JP) .................................. 2021-023441

(51) Int. Cl.
*H04N 23/67* (2023.01)

(52) U.S. Cl.
CPC .......... *H04N 23/672* (2023.01); *H04N 23/673* (2023.01)

(58) Field of Classification Search
CPC .... G06V 10/255; G06V 10/26; G06V 10/273; G06V 40/171
See application file for complete search history.

(56) References Cited

U.S. PATENT DOCUMENTS

| 3,680,085 | A | * | 7/1972 | Del Signore | ......... G01S 13/931 340/904 |
| 11,462,021 | B2 | * | 10/2022 | Oesterling | .............. H04W 4/38 |
| 2002/0181799 | A1 | * | 12/2002 | Matsugu | .............. G06V 10/454 382/260 |
| 2004/0207743 | A1 | * | 10/2004 | Nozaki | .............. H04N 5/23218 348/333.12 |
| 2006/0022814 | A1 | * | 2/2006 | Nogami | .................... G07C 9/25 340/505 |
| 2007/0201726 | A1 | * | 8/2007 | Steinberg | ......... H04N 5/232933 382/103 |
| 2008/0080739 | A1 | * | 4/2008 | Muramatsu | ........ H04N 5/23219 382/103 |

(Continued)

FOREIGN PATENT DOCUMENTS

| JP | 2010191073 A | 9/2010 |
| JP | 2015041901 A | 3/2015 |

*Primary Examiner* — Cynthia Segura
(74) *Attorney, Agent, or Firm* — Canon U.S.A., Inc. IP Division

(57) ABSTRACT

A device includes a focus detection unit configured to detect a defocus amount based on a focus detection signal output from an image capturing device, an object detection unit configured to detect a specific object based on image data output from the image capturing device, and a processing unit configured to perform first obstacle detection processing detecting an obstacle based on characteristics of the defocus amount on the specific object, and to perform second obstacle detection processing detecting an obstacle higher in spatial frequency than the specific object.

32 Claims, 18 Drawing Sheets

(56) References Cited

U.S. PATENT DOCUMENTS

| | | | | |
|---|---|---|---|---|
| 2009/0043439 | A1* | 2/2009 | Barfoot | G05D 1/024 |
| | | | | 701/25 |
| 2013/0050521 | A1* | 2/2013 | Okamoto | H04N 5/232127 |
| | | | | 348/222.1 |
| 2013/0162839 | A1* | 6/2013 | Yoneyama | H04N 5/23218 |
| | | | | 348/169 |
| 2013/0215319 | A1* | 8/2013 | Tomita | G06K 9/6201 |
| | | | | 382/218 |
| 2013/0286217 | A1* | 10/2013 | Tsuji | G06V 40/16 |
| | | | | 348/169 |
| 2016/0093064 | A1* | 3/2016 | Kobayashi | G06V 40/10 |
| | | | | 382/103 |
| 2016/0110604 | A1* | 4/2016 | Yoneyama | G06T 7/90 |
| | | | | 382/103 |
| 2016/0180195 | A1* | 6/2016 | Martinson | G06K 9/628 |
| | | | | 382/103 |
| 2018/0183650 | A1* | 6/2018 | Zhang | H04W 72/21 |
| 2018/0299645 | A1* | 10/2018 | Kuribayashi | H04N 5/232122 |
| 2022/0222475 | A1* | 7/2022 | Oesterling | G08G 1/166 |

* cited by examiner

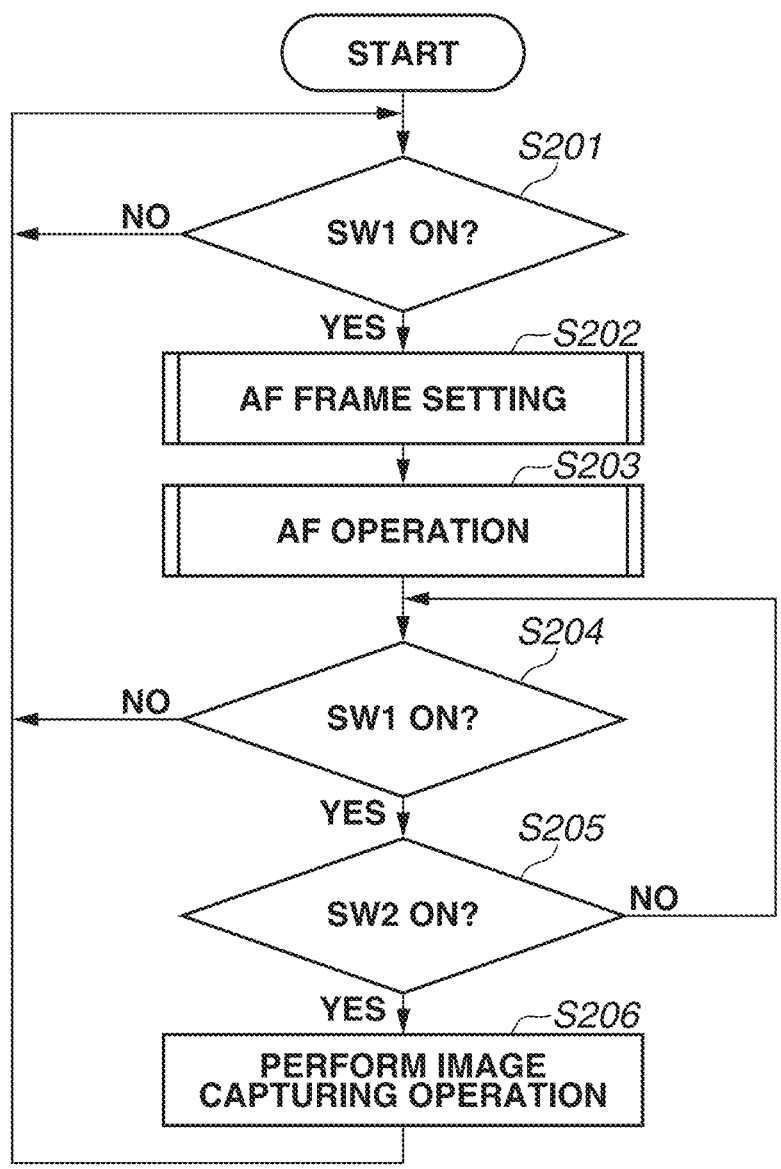

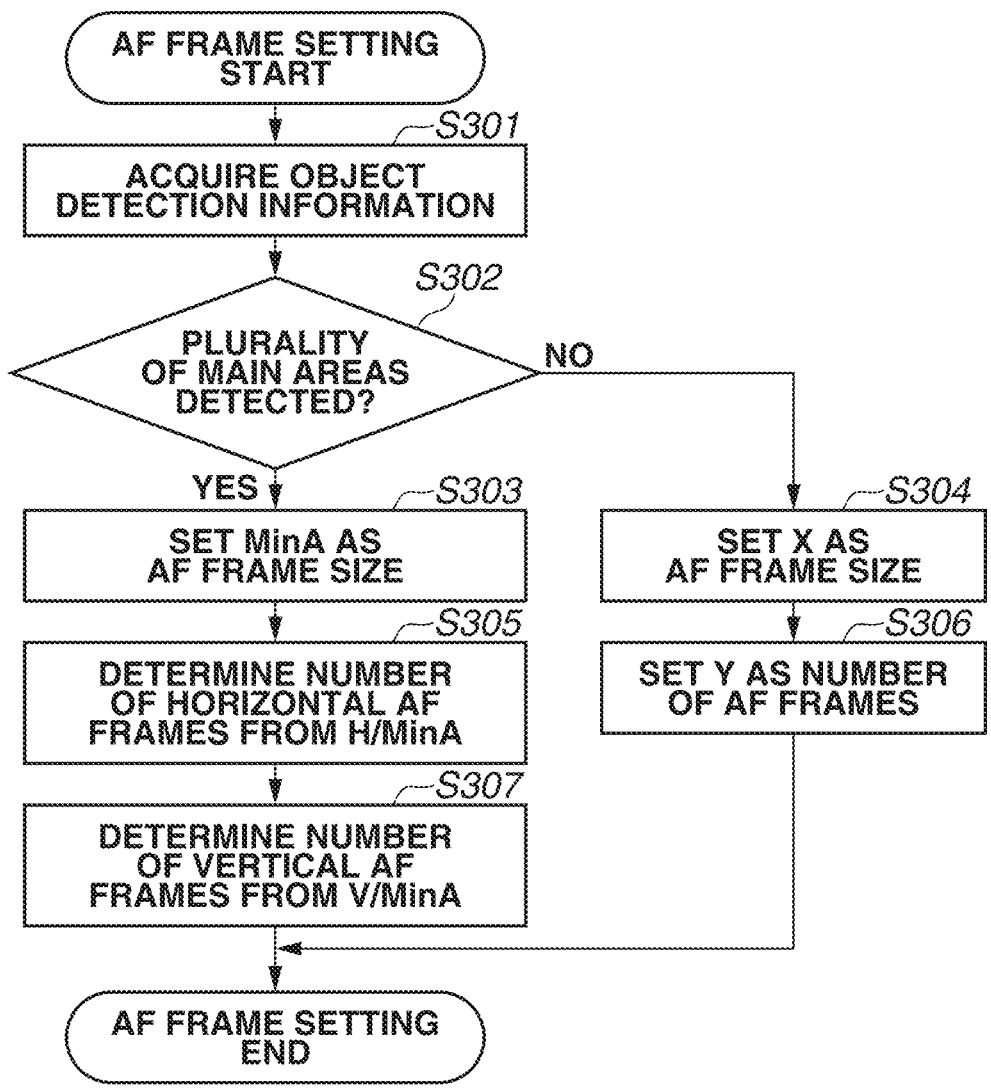

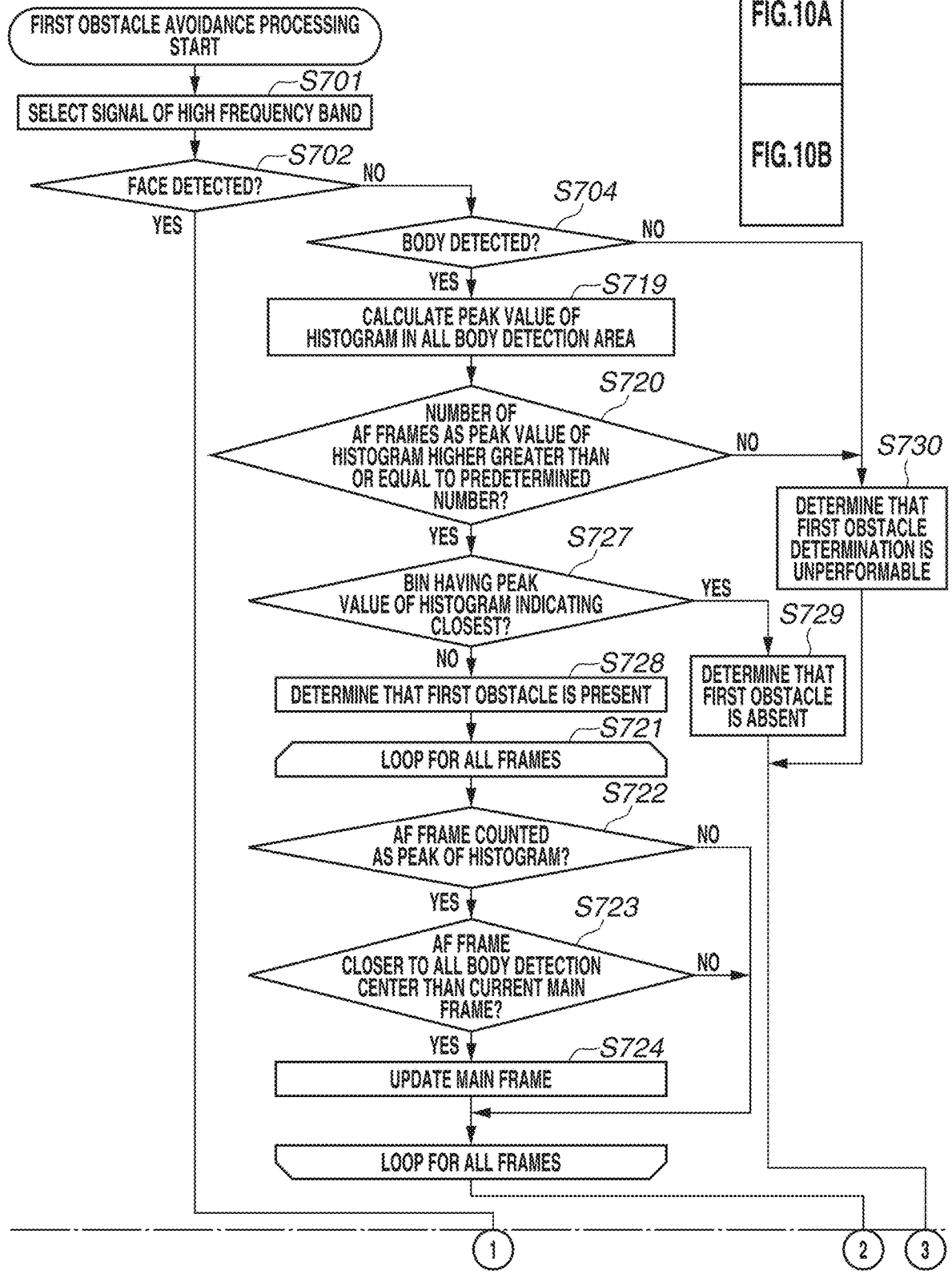

CONTROL DEVICE, IMAGE CAPTURING APPARATUS, AND CONTROL METHOD FOR DETECTING OBSTACLE

BACKGROUND OF THE DISCLOSURE

Field of the Disclosure

The aspect of the embodiments relates to a control device utilizing distance information on an object.

Description of the Related Art

In these days, a camera having a focus adjustment function of automatically adjusting a focus position of an image capturing lens is widely used. As methods to perform the focus adjustment, various autofocus (AF) methods of an imaging plane phase-difference AF method and a contrast AF method, which are implemented by using an image capturing device, are in practical use. Further, in the various AF methods, there is a technique that specifies an area of a main object and focuses the image capturing lens on the main object. In a technique discussed in Japanese Patent Application Laid-Open No. 2010-191073, adjacent blocks within a predetermined depth is detected from a plurality of AF frames, and a main frame is selected from the plurality of AF frames. Further, in a technique discussed in Japanese Patent Application Laid-Open No. 2015-041901, in addition to detection of the blocks within the predetermined depth, color information is considered to improve specification accuracy of the main object area.

However, in Japanese Patent Application Laid-Open Nos. 2010-191073 and 2015-041901, in a state where an object different in distance is present at a position of the main object and in a vicinity of the main object in an image to be captured, a desired focus adjustment result cannot be obtained due to influence of incident light from the object different in distance in some cases.

SUMMARY OF THE DISCLOSURE

According to an aspect of the embodiments, a control device includes a focus detection unit configured to detect a defocus amount based on a focus detection signal output from an image capturing device, an object detection unit configured to detect a specific object based on image data output from the image capturing device, and a processing unit configured to perform first obstacle detection processing detecting an obstacle based on characteristics of the defocus amount on the specific object, and to perform second obstacle detection processing detecting an obstacle higher in spatial frequency than the specific object.

Further features of the disclosure will become apparent from the following description of exemplary embodiments with reference to the attached drawings.

BRIEF DESCRIPTION OF THE DRAWINGS

FIG. 2 is a flowchart illustrating operation of the image capturing apparatus according to the exemplary embodiment of the disclosure.

FIG. 3 is a flowchart illustrating autofocus (AF) frame setting according to the exemplary embodiment of the disclosure.

DESCRIPTION OF THE EMBODIMENTS

An exemplary embodiment of the disclosure is described in detail below with reference to accompanying drawings.
<Configuration of Image Capturing Apparatus>

Figure 1:
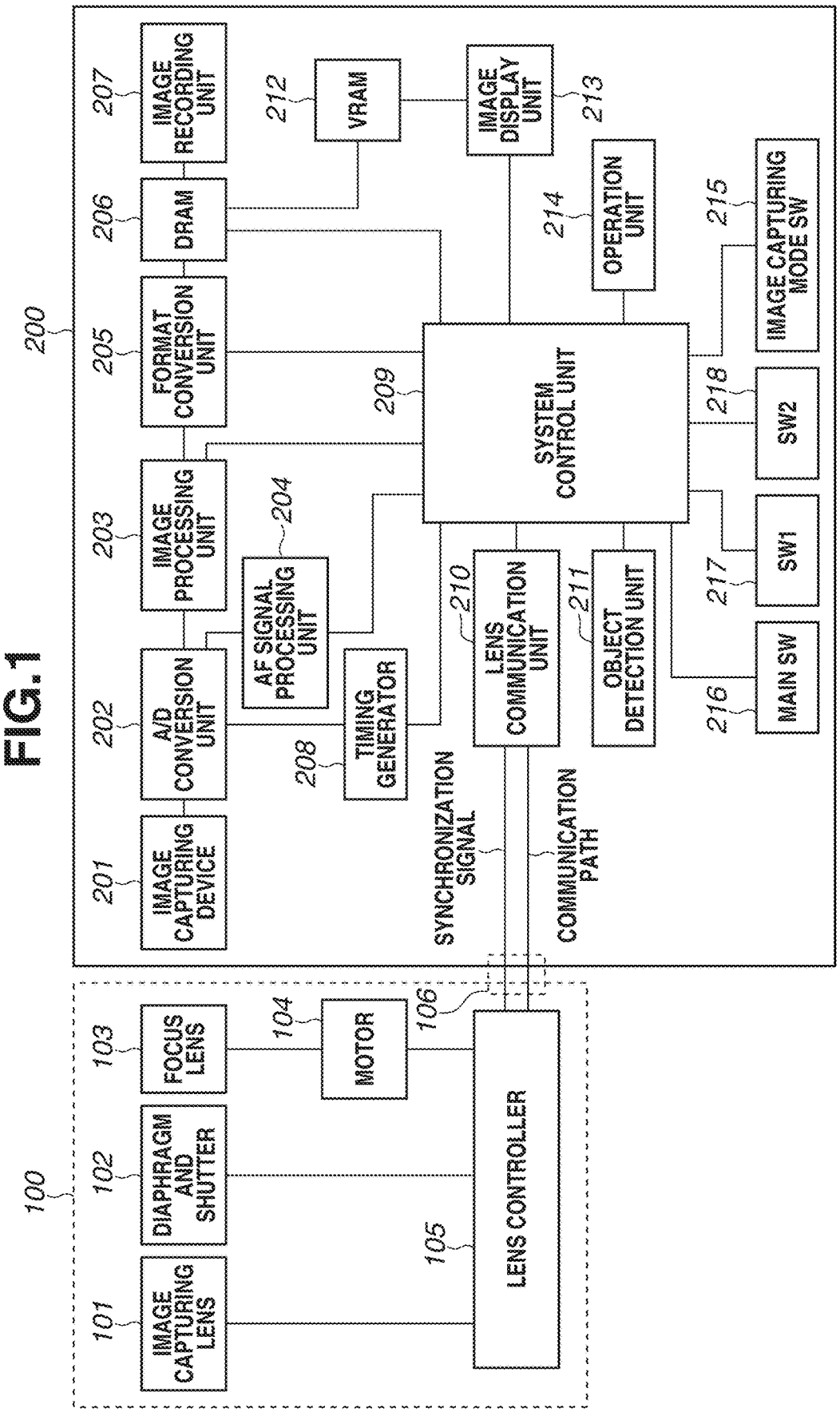
FIG. 1 is a block diagram illustrating a configuration of an image capturing apparatus according to an exemplary embodiment of the disclosure.

FIG. 1 is a block diagram illustrating a configuration of a lens interchangeable camera (hereinafter, simply referred to as camera) according to the present exemplary embodiment. The camera according to the present exemplary embodiment is an example of an image capturing apparatus including a control device according to the present exemplary embodiment, and performs focus adjustment by an imaging plane phase-difference detection method using an output signal from an image capturing device capturing an image of an object. The camera includes a lens unit (interchangeable lens) 100 and a camera main body 200. When the lens unit 100 is attached to the camera main body 200 through a mount portion including an electrical contact unit 106, a lens controller 105 that controls entire operation of the lens unit 100 and a system control unit 209 that controls operation of the entire camera become communicable with each other.

First, a configuration of the lens unit 100 is described. The lens unit 100 includes an image capturing lens 101 including a zoom mechanism, a diaphragm and shutter 102 for controlling a light quantity, a focus lens 103 to adjust focus on an image capturing device described below, a motor 104 for driving the focus lens 103, and the lens controller 105.

Next, a configuration of the camera main body 200 is described. The camera main body 200 is configured to acquire an image capturing signal from a light flux passing through an image capturing optical system of the lens unit 100. The camera main body 200 includes an image capturing device 201 that photoelectrically converts light reflected by the object into an electrical signal, an analog-to-digital (A/D) conversion unit 202 that includes a correlated double sampling (CDS) circuit that removes output noise of the image capturing device 201 and a nonlinear amplification circuit that performs processing before A/D conversion, an image processing unit 203, and an autofocus (AF) signal processing unit 204. The camera main body 200 further includes a format conversion unit 205, a high-speed built-in memory (e.g., random access memory, hereinafter, referred to as dynamic random access memory (DRAM)) 206, and an image recording unit 207 including a recording medium such as a memory card and an interface for the recording medium. The camera main body 200 further includes a timing generator 208, the system control unit 209 that controls a system such as an image capturing sequence, a lens communication unit 210 that performs communication between the camera main body 200 and the interchangeable lens, an object detection unit 211, and a video random access memory (VRAM)) 212, which is an image display memory.

Further the camera main body 200 includes an image display unit 213 that displays, in addition to an image, an operation guide, and a camera state, an image capturing screen and an index indicating an AF frame at the time of image capturing. The camera main body 200 further includes an operation unit 214 allowing the camera operation by a user from outside, an image capturing mode switch 215 for selecting an image capturing mode such as a macro mode and a sport mode, and a main switch 216 to turn on the system.

The camera main body 200 further includes a switch (hereinafter, referred to as SW1) 217 to perform image capturing standby operation such as AF and automatic exposure (AE), and an image capturing switch (hereinafter, referred to as SW2) 218 to capture an image after the operation of the SW1. The DRAM of the built-in memory 206 is used as, for example, a high-speed buffer that is a temporal image storage unit or a work memory for image compression/expansion. The operation unit 214 includes, for example, a menu switch used for various kinds of setting such as setting of an image capturing function and image reproduction of the image capturing apparatus, and an operation mode selection switch used to select an image capturing mode and a reproduction mode.

The image capturing device 201 includes a charge-coupled device (CCD) sensor or a complementary metal-oxide semiconductor (CMOS) sensor. Each of pixels of the image capturing device 201 used in the present exemplary embodiment includes two (a pair of) photodiodes A and Frequency band one microlens provided for the pair of photodiodes A and B. Incident light is divided by the microlens to form a pair of optical images on the pair of photodiodes A and Frequency band outputs a pair of pixel signals (A signal and B signal) used as AF signals described below, from the pair of photodiodes A and B. The outputs of the pair of photodiodes A and B are added to obtain image data as an image capturing signal (A+B signal).

The plurality of A signals and the plurality of B signals output from the plurality of pixels are respectively combined to obtain a pair of image signals as the AF signals (i.e., focus detection signals) used for AF of an imaging plane phase-difference detection method (hereinafter, referred to as imaging plane phase-difference AF). The AF signal processing unit 204 performs correlation calculation on the pair of image signals to calculate a phase difference as a shift amount of the pair of image signals (hereinafter, referred to as image shift amount), and further calculates a defocus amount (and defocus direction and reliability) of the image capturing optical system from the image shift amount. The AF signal processing unit 204 calculates the plurality of defocus amounts in a designatable predetermined area.

The configuration of the image capturing device 201 is not limited to the above-described configuration as long as the image capturing device 201 has a pupil dividing function and the AF of the phase-difference detection method (imaging plane phase-difference AF) can be performed by using the pair of focus detection signals generated from the outputs of the image capturing device 201. For example, the image capturing device 201 may include image capturing pixels outputting an image signal corresponding to the captured image and pairs of focus detection pixels each receiving a pair of pupil-divided light fluxes.

<Operation of Image Capturing Apparatus>

Operations of the image capturing apparatus according to the present exemplary embodiment is described with reference to FIG. 2. FIG. 2 illustrates a procedure of image capturing control processing performed in a case where a still image is captured in a state where a live view image is displayed. The system control unit 209 as a computer performs this processing based on a control program as a computer program. First, in step S201, a state of the SW1 (217) is checked. In a case where the SW1 (217) is in an on state (YES in step S201), the processing proceeds to step S202. In step S202, the system control unit 209 performs AF frame setting described below to the AF signal processing unit 204. The processing then proceeds to step S203. In step S203, the AF operation described below is performed. The processing then proceeds to step S204. In step S204, the state of the SW1 (217) is checked. In a case where the SW1 (217) is in the on state (YES in step S204), the processing proceeds to step S205. Otherwise (NO in step S204), the processing returns to step S201. In step S205, a state of the SW2 (218) is checked. In a case where the SW2 (218) is an on state (YES in step S205), the processing proceeds to step S206. Otherwise (NO in step S205), the processing returns to step S204. In step S206, image capturing operation is performed. Thereafter, the processing returns to step S201.

<AF Frame Setting>

FIG. 3 is a flowchart illustrating the AF frame setting operation performed in step S202 of FIG. 2. First, in step S301, object detection information is acquired from the object detection unit 211. In the present exemplary embodiment, a person or an animal such as a dog and a wild bird is detected as an object, and main areas of the object are further detected. The main areas are areas of a pupil, a face, and a body of the person or the animal. The detection is performed by using a learning method of a well-known machine learning or recognition processing by an image processing unit.

For example, the machine learning includes the following types.
(1) Support Vector Machine
(2) Convolutional Neural Network
(3) Recurrent Neural Network Further, as another example of the recognition processing, a method of extracting a skin-colored area from gradation colors of each of the pixels represented by image data, to detect a face based on a matching degree with a face contour plate prepared in advance is known. Further, a method of detecting a face by extracting face feature points such as eyes, a nose, and a mouth by using pattern recognition technology is also well-known. Further, the method of detecting the main areas applicable to the aspect of the embodiments is not limited to these methods, and the other methods may be used.

In step S302, it is determined whether a plurality of main areas has been detected in a detection result of the object detection unit 211. In a case where the plurality of main areas has been detected (YES in step S302), the processing proceeds to step S303. Otherwise (NO in step S302), the processing proceeds to step S304.

Figure 4A:
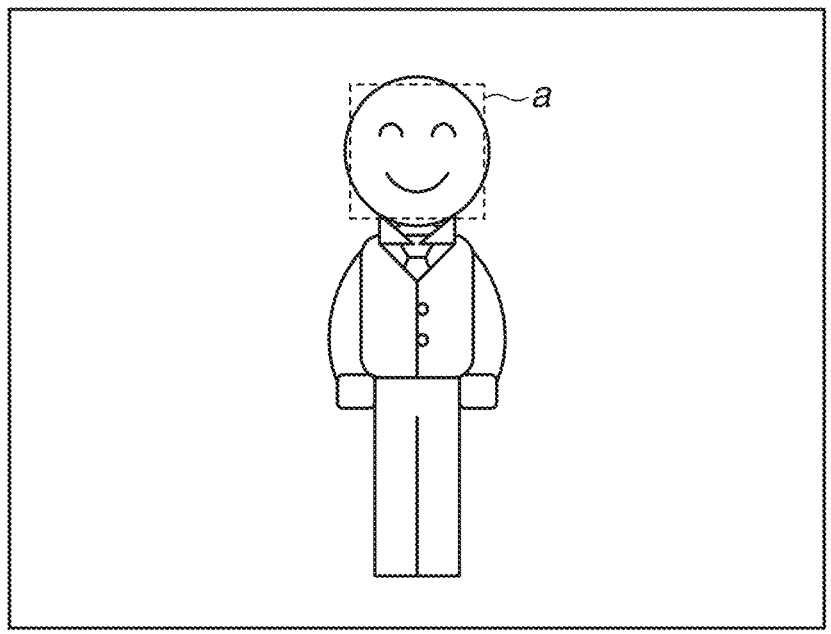
FIGS. 4A and 4B are diagrams respectively illustrating a detection area and an AF frame setting with respect to a face of a person according to the exemplary embodiment of the disclosure.
Figure 4B:
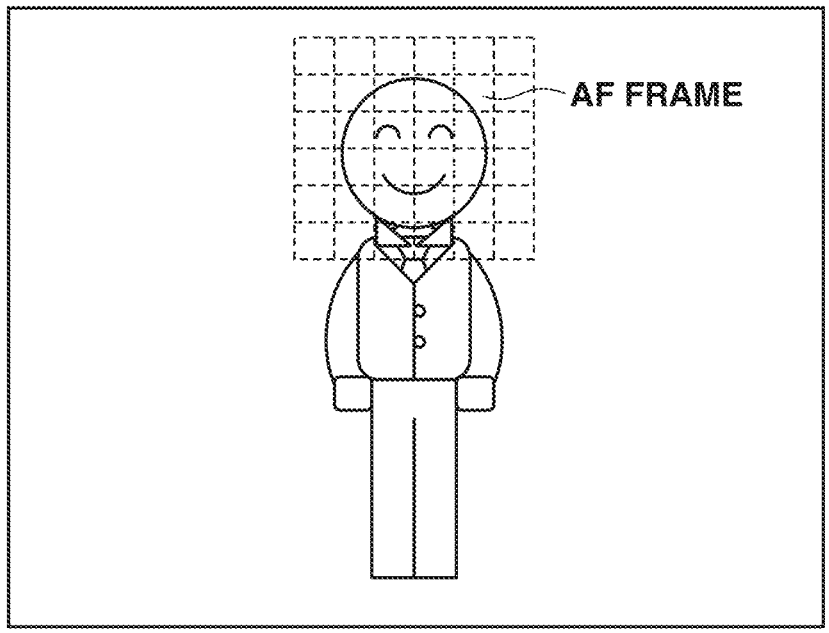
Figure 5A:
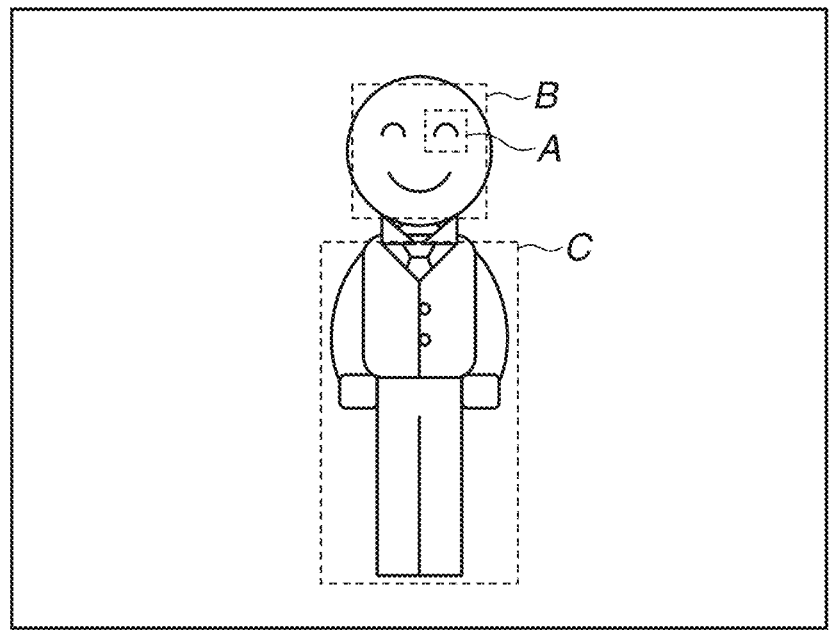
FIGS. 5A and 5B are diagrams respectively illustrating detection areas and an AF frame setting with respect to a pupil, a face, and a body of a person according to the exemplary embodiment of the disclosure.
Figure 5B:
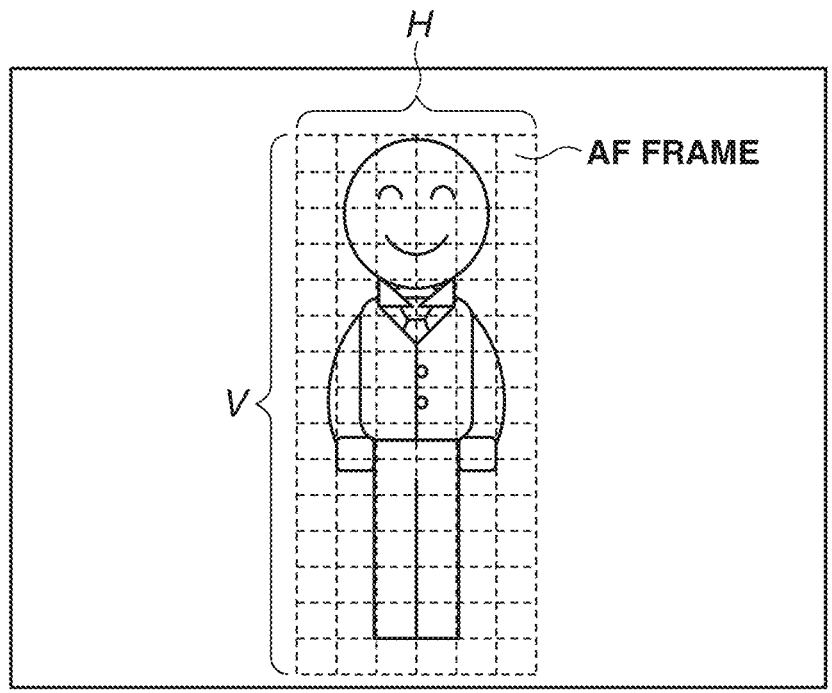

Detection concepts of a case where one main areas is detected and in a case where a plurality of main areas is detected are described with reference to FIGS. 4A and 4B and FIGS. 5A and 5B. FIG. 4A illustrates a state where a face a is detected, and FIG. 5A illustrates a state where a pupil A, a face B, and a body C are detected. A type of the object such as the person and the animal, and a center coordinate, a horizontal size, and a vertical size of each of the detected main areas can be acquired from the object detection unit 211.

Figure 6A:
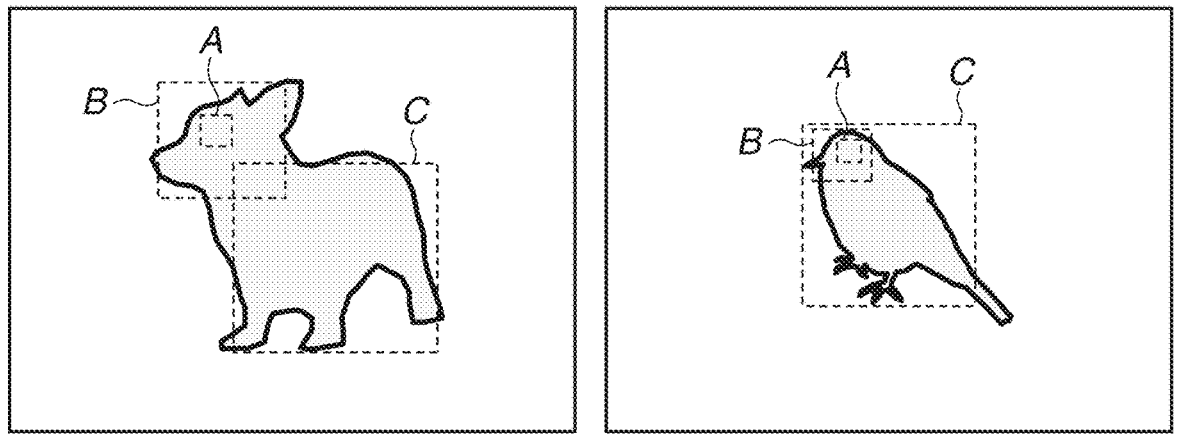
FIGS. 6A and 6B are diagrams respectively illustrating detection areas and an AF frame setting to a pupil, a face, and a body of an animal according to the exemplary embodiment of the disclosure.
Figure 6B:
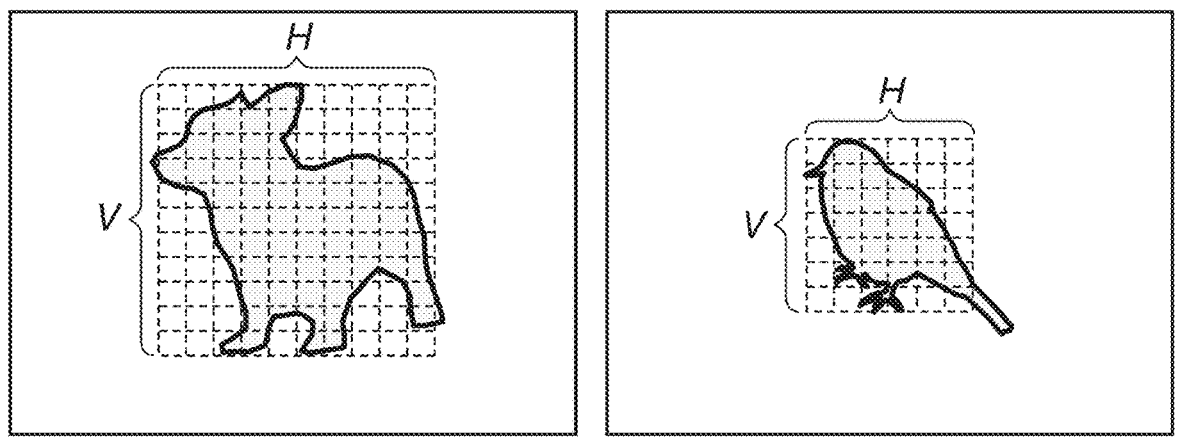

In step S303, a minimum size of the detected main area, i.e., a smaller value of the horizontal and vertical sizes of the pupil A in FIG. 5A is input to MinA to define MinA as one AF frame size. In step S305, a horizontal size H in FIG. 5B encompassing all of the main areas is determined from the horizontal coordinates and the horizontal sizes of the respective detected main areas, and the number of horizontal AF frames is determined by dividing the horizontal size H by the AF frame size MinA. In step S307, a vertical size V in FIG. 5B encompassing all of the main areas is determined from the vertical coordinates and the vertical sizes of the respective detected main areas, and the number of vertical AF frames is determined by dividing the vertical size V by the AF frame size MinA. The AF frame setting then ends. In a case of the animal, a control flow is similar to the control flow in the case of the person. FIGS. 6A and 6B are conceptual diagrams of the detected areas and the AF frame setting. In the present exemplary embodiment, the AF frame size is set to a size of a square area using the minimum size; however, the horizontal AF frame size and the vertical AF frame size may be different from each other, and the number of AF frames that can be calculated by the system control unit 209 may be set.

In step S304, the AF frame having a predetermined size X is set to the detected face. The size X may be set to a pupil size estimated from the face, or may be set to a frame size at which a signal-to-noise ratio (S/N) is can be secured and sufficient focus performance is obtainable, in consideration of a low-illuminance environment. In the present exemplary embodiment, the size X is set to an estimated pupil size. In step S306, the number of AF frames Y that encompasses the area of the face having the above-described AF frame size and can handle a case where the face is moved, is set.

Figure 7:
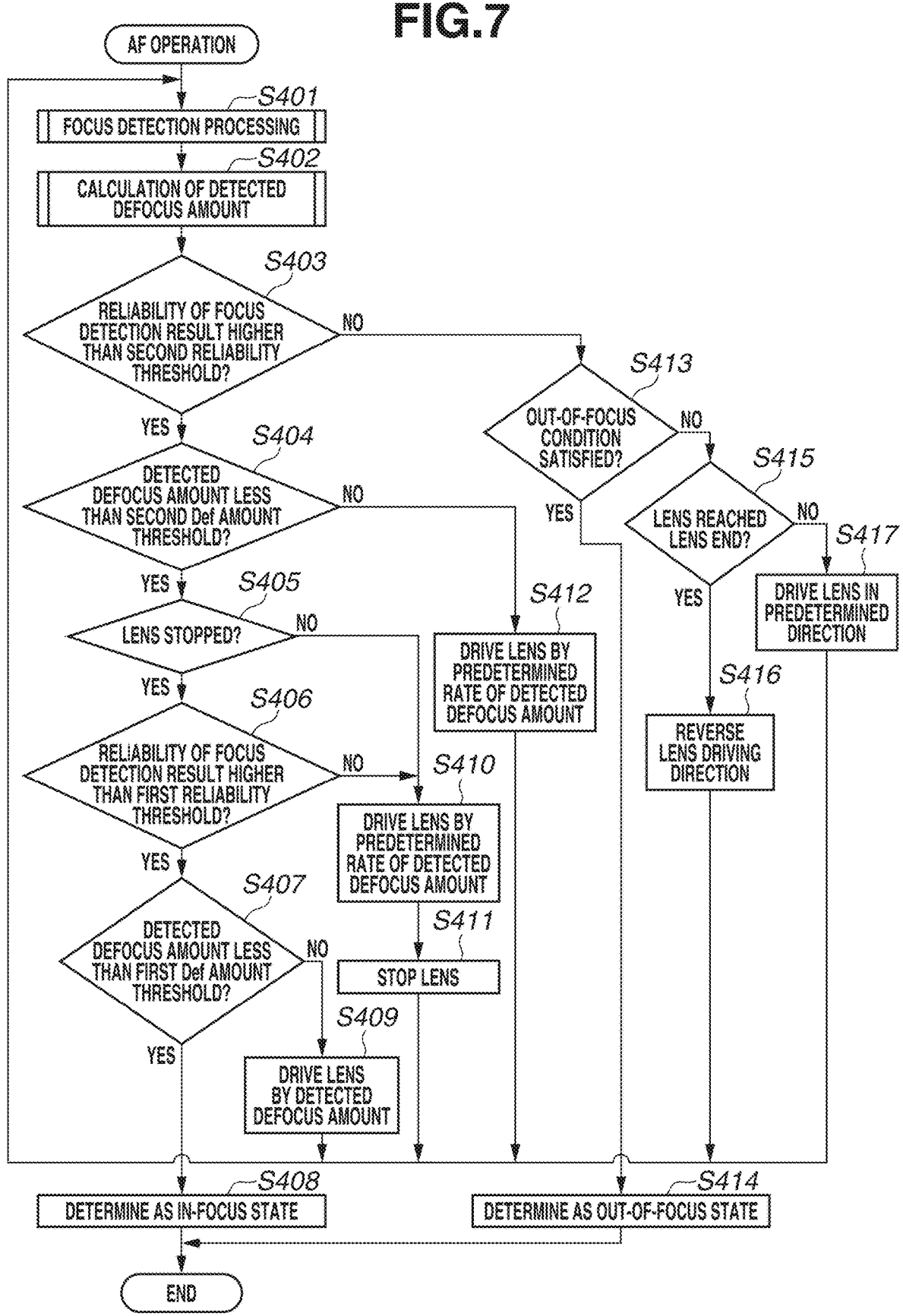
FIG. 7 is a flowchart illustrating a procedure of AF operation according to the exemplary embodiment of the disclosure.

<AF Operation>
FIG. 7 is a flowchart illustrating the AF operation performed in step S203. First, in step S401, focus detection processing is performed to detect the defocus amount (including defocus direction) and reliability. The processing then proceeds to step S402. The focus detection processing is described below. In step S402, the system control unit 209 performs calculation of a detected defocus amount described below by using the reliability obtained in step S401. The processing then proceeds to step S403. In step S403, it is determined whether the reliability detected in step S401 is higher than a preset second reliability threshold. In a case where the reliability is higher than the second reliability threshold (YES in step S403), the processing proceeds to step S404. Otherwise (NO in step S403), the processing proceeds to step S413. At this time, the second reliability threshold is set to a value at which, when the reliability is less than the second reliability threshold, accuracy of the defocus amount is not secured but a focus position direction of the object is secured. In step S404, it is determined whether the defocus amount detected in step S401 is less than a preset second Def amount threshold. In a case where the detected defocus amount is less than the second Def amount threshold (YES in step S404), the processing proceeds to step S405. Otherwise (NO in step S404), the processing proceeds to step S412. At this time, the second Def amount threshold is set to a value (e.g., value of five times depth of focus) at which, when the defocus amount is less than or equal to the second Def amount threshold, the focus lens is controllable within a depth of focus by performing the lens driving of the defocus amount within a predetermined number of times (e.g., three times). In step S405, it is determined whether the focus lens 103 is in a stop state. In a case where the focus lens 103 is in the stop state (YES in step S405), the processing proceeds to step S406. Otherwise (NO in step S405), the processing proceeds to step S410. In step S406, it is determined whether the reliability detected in step S402 is higher than a preset first reliability threshold. In a case where the detected reliability is higher than the first reliability threshold (YES in step S406), the processing proceeds to step S407. Otherwise (NO in step S406), the processing proceeds to step S410. At this time, the first reliability threshold is set so that, when the reliability is higher than or equal to the first reliability threshold, accuracy variation of the defocus amount is within a predetermined range (e.g., within depth of focus). In step S407, it is determined whether the defocus amount detected in step S401 is less than a preset first Def amount threshold. In a case where the detected defocus amount is less than the first Def amount threshold (YES in step S407), the processing proceeds to step S408. Otherwise (NO in step S407), the processing proceeds to step S409. At this time, the first Def amount threshold is set so that, when the detected defocus amount is less than or equal to the first Def amount threshold, the focus lens is controlled within the depth of focus. In step S408, it is determined to be an in-focus state. The processing in this flowchart then ends. In step S409, the focus lens 103 is driven by the defocus amount detected in step S401. Thereafter, the processing proceeds to step S401. In the case where the reliability detected in step S401 is higher than the first reliability threshold, in-focus determination can be performed in a state where the lens is stopped, by performing the series of processing in steps S405 to S409.

In step S410, the focus lens 103 is driven by a predetermined rate of the defocus amount detected in step S401. The processing then proceeds to step S411. In step S411, stop of the focus lens 103 is instructed. The processing then proceeds to step S401. In step S412, since the defocus amount is not less than or equal to the second Def amount threshold, the focus lens 103 is driven by a predetermined rate of the defocus amount detected in step S401. Thereafter, the processing proceeds to step S401. The predetermined rate is set so that a lens driving amount becomes smaller than the defocus amount (e.g., 80 percent). Further, a lens speed is set to be lower than a speed at which the lens is driven in a time corresponding to just one frame. This makes it possible to prevent a lens position from exceeding an object focus position in a case where the detected defocus amount is incorrect, and to perform next lens driving without stopping the lens (overlap control).

In step S413, it is determined whether an out-of-focus condition has been satisfied. In a case where the out-of-focus condition has been satisfied (YES in step S413), the processing proceeds to step S414. Otherwise (NO in step S413), the processing proceeds to step S415. The out-of-focus condition is a predetermined condition for determining that an object to be focused is absent. For example, a condition that the lens driving has been completed in an entire movable range of the focus lens 103, i.e., a condition that the focus lens 103 detects lens ends on both of a far side and a close side and then returns to an initial position, is set. In step S414, it is determined to be an out-of-focus state. The processing in this flowchart then ends. In step S415, it is determined whether the focus lens 103 has reached the lens end on the far side or the close side. In a case where the focus lens 103 has reached the lens end (YES in step S415), the processing proceeds to step S416. Otherwise (NO in step S415), the processing proceeds to step S417. In step S416, a driving direction of the focus lens 103 is reversed. The processing then proceeds to step S401. In step S417, the focus lens 103 is driven in a predetermined direction. The processing then proceeds to step S401. For example, a focus lens speed is set to the fastest speed within a range where the lens does not pass the in-focus position at a time when the defocus amount becomes detectable.

<Focus Detection Processing>

The focus detection processing in step S401 is described with reference to FIG. 8. First, in step S501, focus detection areas of an optional range are set in the image data output from the image capturing device 201. The processing then proceeds to step S502. The focus detection areas set at this time correspond to the respective AF frames set in step S202. In step S502, the pairs of focus detection image signals (A image and B image) are acquired from the pixels of the image capturing device 201 corresponding to the respective focus detection areas set in step S501. The processing then proceeds to step S503. In step S503, row addition average processing is performed on the pairs of signals acquired in step S502 in a vertical direction. Thereafter, the processing proceeds to step S504. This processing makes it possible to reduce influence of noise of the image signals. In step S504, filter processing to extract signal components of predetermined frequency bands from the signals obtained by the vertical row addition average processing in step S503 is performed. Thereafter, the processing proceeds to step S505. At this time, signal components of a plurality of frequency bands (high frequency band, middle frequency band, and low frequency band) are extracted, and processing at step S505 and subsequent steps is performed on each of the signal components. In step S505, a correlation amount is calculated from the signal subjected to the filter processing in step S504. The processing then proceeds to step S506. In step S506, a correlation change amount is calculated from the correlation amount calculated in step S505. The processing then proceeds to step S507. In step S507, an image shift amount is calculated from the correlation change amount calculated in step S506. The processing then proceeds to step S508. In step S508, reliability representing how reliable the image shift amount calculated in step S507 is, is calculated. The processing then proceeds to step S509. In step S509, the image shift amount is converted into the defocus amount (including defocus direction). The focus detection processing then ends. In this way, the defocus amount (including the defocus direction) and the reliability are obtained in step S401.

<Calculation of Detected Defocus Amount>

Figure 9:
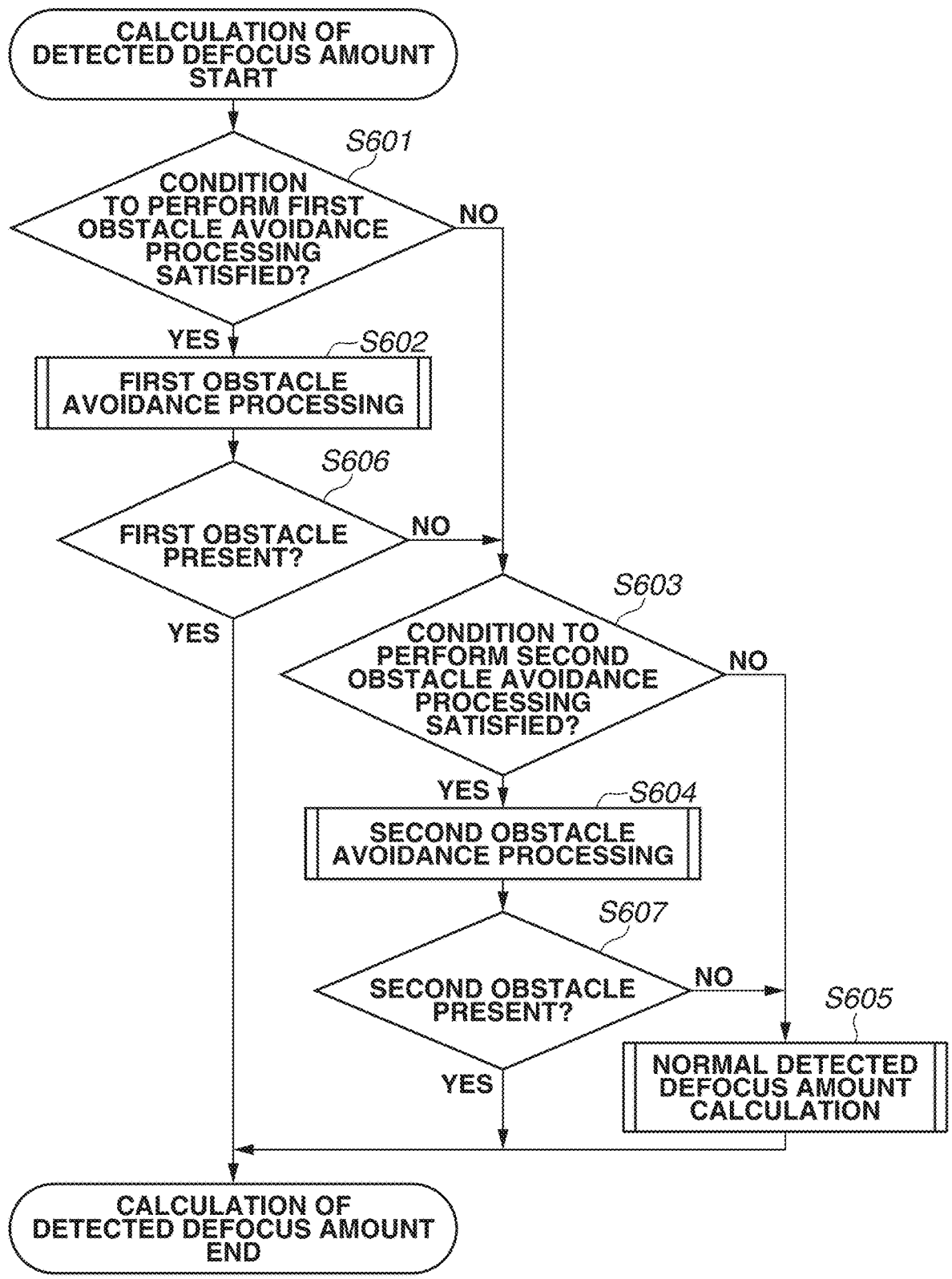
FIG. 9 is a flowchart illustrating a procedure of calculating a detected defocus amount according to the exemplary embodiment of the disclosure.

Calculation of the detected defocus amount in step S402 is described with reference to FIG. 9. First, in step S601, it is determined whether a condition to perform first obstacle avoidance processing has been satisfied. The first obstacle avoidance processing is performed, for example, when the type of the object detected by the object detection unit 211 is an animal. This is based on the fact that an image of the animal is often captured together with an obstacle relatively low in spatial frequency, such as a cage. In a case where the condition to perform the first obstacle avoidance processing has been satisfied (YES in step S601), the processing proceeds to step S602. Otherwise (NO in step S601), the processing proceeds to step S603. By proceeding to step S603, the first obstacle avoidance processing is omitted. In step S602, the first obstacle avoidance processing described below is performed by using the detection result of the object detection unit 211 and the defocus amount calculated by the processing in step S509. The processing then proceeds to step S606. In step S606, it is determined whether a first obstacle is present in step S602. In a case where it is determined that the first obstacle is present (YES in step S606), the calculation of the detected defocus amount ends. In a case where it is not determined that the first obstacle is present or the first obstacle determination is unperformable (NO in step S606), the processing proceeds to step S603. In a case where it is determined in step S601 that the condition to perform the first obstacle avoidance processing has been satisfied and it is determined in step S606 that the first obstacle is present after execution of the processing in step S602, second obstacle avoidance processing is omitted.

In step S603, it is determined whether a condition to perform the second obstacle avoidance processing has been satisfied. The second obstacle avoidance processing is performed, for example, when the type of the object detected by the object detection unit 211 is a person. This is based on the fact that an image of the person is often captured together with an obstacle relatively high in spatial frequency, such as a net (e.g., image capturing through net such as a net of baseball stadium and a net for volleyball, in sport watching). In a case where the condition to perform the second obstacle avoidance processing has been satisfied (YES in step S603), the processing proceeds to step S604. Otherwise (NO in step S603), it is determined that the type of the object is a third object type that is neither an animal nor a person, and the processing proceeds to step S605 while omitting the first and second obstacle detection processing. In step S604, the second obstacle avoidance processing described below is performed by using the detection result of the object detection unit 211 and the defocus amount calculated by the processing in step S509. The processing then proceeds to step S607. In step S607, it is determined whether a second obstacle is present in step S604. In a case where it is determined that the second obstacle is present (YES in step S607), calculation of the detected defocus amount ends. In a case where it is not determined that the second obstacle is present or the second obstacle determination is unperformable (NO in step S607), the processing proceeds to step S605.

In step S605, normal detected defocus amount calculation described below is performed by using the detection result of the object detection unit 211 and the defocus amount calculated by the processing in step S509. Calculation of the detected defocus amount then ends.

<First Obstacle Avoidance Processing>

Figure 10B:
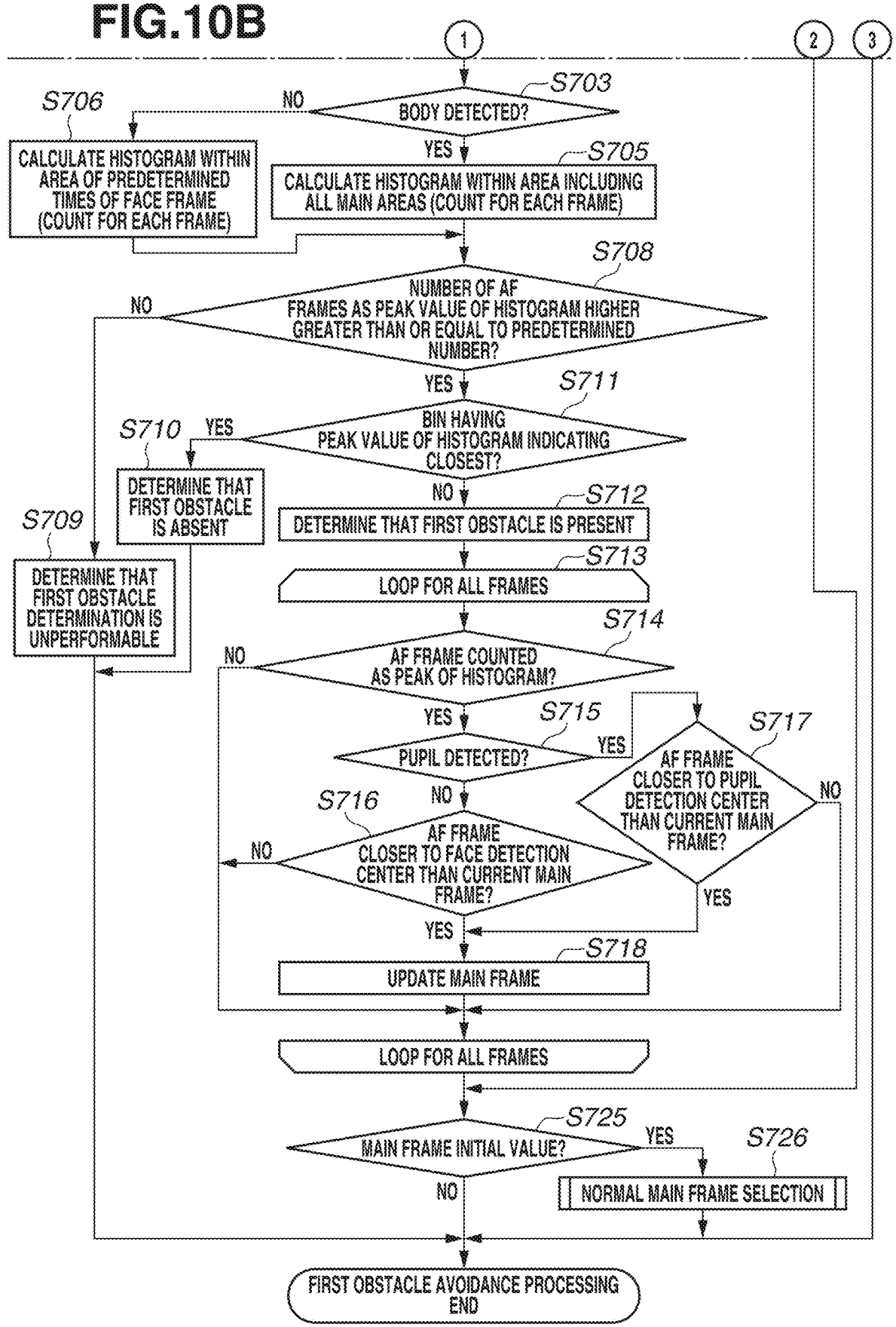
FIG. 10 (consisting of FIGS. 10A and 10B) is a flowchart illustrating first obstacle avoidance processing according to the exemplary embodiment of the disclosure.

FIG. 10 (consisting of FIGS. 10A and 10B) is a flowchart illustrating the first obstacle avoidance processing in step S602. In the present exemplary embodiment, detail of a histogram as an image analysis method is not described because use of the histogram is a general technique.

First, in a case where focus detection is performed on the signals of the plurality of frequency bands by the processing in step S509, the defocus amount detected by the signal of the highest frequency band is set to be used in step S701. The processing then proceeds to step S702. In step S702, it is determined whether a face of the object has been detected by the object detection unit 211. In a case where the face has been detected (YES in step S702), the processing proceeds to step S703. In a case where the face has not been detected (NO in step S702), the processing proceeds to step S704. In step S703, it is determined whether a body of the object has been detected by the object detection unit 211. In a case where the body has been detected (YES in step S703), the processing proceeds to step S705. In a case where the body has not been detected (NO in step S703), the processing proceeds to step S706. In step S705, the defocus amount set on each of the AF frames encompassing all of the main areas by the processing in step S701 is counted for each predetermined depth, to create a histogram. In the present exemplary embodiment, the defocus amount itself is converted into a histogram; however, in consideration of the moving object, a predicted amount (object distance) corresponding to the object position may be determined based on the defocus amount calculated for each of the AF frames, and the predicted value may be converted into a histogram. Further, in step S706, the defocus amount calculated for each of the AF frames set in an area of predetermined times the face frame is counted for each predetermined depth, to create a histogram.

In step S708, it is determined whether a peak value (number of AF frames as peak of histogram) of the histogram created in step S705 or S706 is greater than or equal to a predetermined value. In the present exemplary embodiment, the peak value of the histogram is converted into a rate by normalizing the peak value of the histogram by the number of all AF frames, and the rate is used. In a case where the peak value is greater than or equal to a predetermined rate (YES in step S708), the processing proceeds to step S711. In a case where the peak value is less than the predetermined rate (NO in step S708), the processing proceeds to step S709. In step S709, it is determined that the first obstacle determination is unperformable, and the first obstacle avoidance processing ends. In step S711, it is determined whether a bin having the peak value of the histogram determined in step S708 is a bin representing the closest distance side of the histogram. In a case where the bin having the peak value is the bin representing the closest distance side (YES in step S711), the processing proceeds to step S710. Otherwise (NO in step S711), the processing proceeds to step S712. The histogram is the image analysis method that divides numerical values discretely present by a prescribed width into groups, and displays the groups in a bar graph to visualize distribution of the numerical values. The bin is one group (one bar in bar graph) divided by the prescribed width. In the create histogram, it is determined that the bar representing the closest distance side corresponds to a peak. In a case where the peak is on the closest distance side, it is determined that an obstacle is not present because the object is present on the closest distance side. Otherwise, something is present in front of the object, and it is determined that an obstacle is present.

In step S712, it is determined that the first obstacle is present in front of the main object. The processing then proceeds to step S713. In step S710, it is determined that the first obstacle is absent in front of the main object. The first obstacle avoidance processing then ends. In step S713, to select a main frame from the set AF frames, a series of processing in steps S714 to S717 performed on one AF frame of interest is performed on all of the AF frames in a loop manner. Further, as an initial value of the main frame, information (e.g., number of all frames+1) indicating that no main frame is selected is previously set, and illustration thereof is omitted. In step S714, it is determined whether the AF frame of interest is an AF frame counted as the peak of the histogram. In a case where the AF frame of interest is the AF frame counted as the peak of the histogram (YES in step S714), the processing proceeds to step S715. Otherwise (NO in step S714), the processing in step S713 is repeated in a loop manner. In step S715, it is determined whether a pupil has been detected. In a case where a pupil has been detected (YES in step S715), the processing proceeds to step S717. Otherwise (NO in step S715), the processing proceeds to step S716. In step S716, in a case where a coordinate of the AF frame of interest is closer to a face detection center than the currently-selected main frame (YES in step S716), the AF frame of interest is set as the main frame in step S718. In step S717, in a case where the coordinate of the AF frame of interest is closer to a pupil detection center than the current main frame (YES in step S717), the AF frame of interest is set as the main frame in step S718.

In step S704, it is determined whether a body has been detected by the object detection unit 211. In a case where a body has been detected (YES in step S704), the processing proceeds to step S719. In a case where a body has not been detected (NO in step S704), the processing proceeds to step S730. In step S719, the histogram of a full body detection area is created and a peak value of the histogram is determined. In step S720, it is determined whether the peak value of the histogram created in step S719 is greater than or equal to a predetermined rate. In a case where the peak value of the histogram is greater than or equal to the predetermined rate (YES in step S720), the processing proceeds to step S727. In a case where the peak value of the histogram is less than the predetermined rate (NO in step S720), the processing proceeds to step S730. In step S727, it is determined whether a bin having the peak value of the histogram determined in step S720 is a bin representing the closest distance side. In a case where the bin having the peak value is the bin representing the closest distance side (YES in step S727), the processing proceeds to step S729. Otherwise (NO in step S727), the processing proceeds to step S728. In step S728, it is determined that the first obstacle is present in front of the main object. The processing then proceeds to step S721. In step S721, to select a main frame from the set AF frames, a series of processing in steps S722 to S724 performed on one AF frame of interest is performed on all of the AF frames in a loop manner as in step S713. In step S722, it is determined whether the AF frame of interest is the AF frame counted as the peak of the histogram. In a case where the AF frame of interest is the AF frame counted as the peak of the histogram (YES in step S722), the processing proceeds to step S723. Otherwise (NO in step S722), the processing in step S721 is repeated in a loop manner. In step S723, in a case where a coordinate of the AF frame of interest is closer to a full body detection center than the currently-selected main frame (YES in step S723), the AF frame of interest is set as the main frame in step S724.

In step S729, it is determined that the first obstacle is absent in front of the main object. The first obstacle avoidance processing then ends. In step S730, it is determined that the first obstacle determination is unperformable. The first obstacle avoidance processing then ends.

In step S725, it is determined whether the main frame has been selected in the above-described flowchart, by determining whether the main frame is the initial value. In a case where the main frame is the initial value (YES in step S725), the processing proceeds to step S726. Otherwise (NO in step S725), the first obstacle avoidance processing ends. In step S726, normal main frame selection described below is performed. The first obstacle avoidance processing then ends.

In a case where a defocus amount difference is not greater than or equal to a predetermined value in the object area, the processing may proceed to step S726, and the main frame may be selected in a predetermined area of a screen. Further, in the main frame selection, the main frame to be selected may be changed depending on whether the object is a stationary object or a moving object. More specifically, in a case where the object is a stationary object, the area to be focused is determined based on information about the number of focused areas as described above. In a case where the object is a moving object, the area to be focused is determined based on past focus detection information. Further, in the main frame selection, the main frame to be selected may be changed depending on whether a mode is a stationary object capturing mode or a moving object capturing mode. More specifically, in a case of the stationary object capturing mode, the area to be focused is determined based on the information about the number of focused areas as described above. In a case of the moving object capturing mode, the area to be focused is determined based on the past focus detection information.

<Second Obstacle Avoidance Processing>

First, a focus detection result used in the second obstacle avoidance processing is described.

Figure 8:
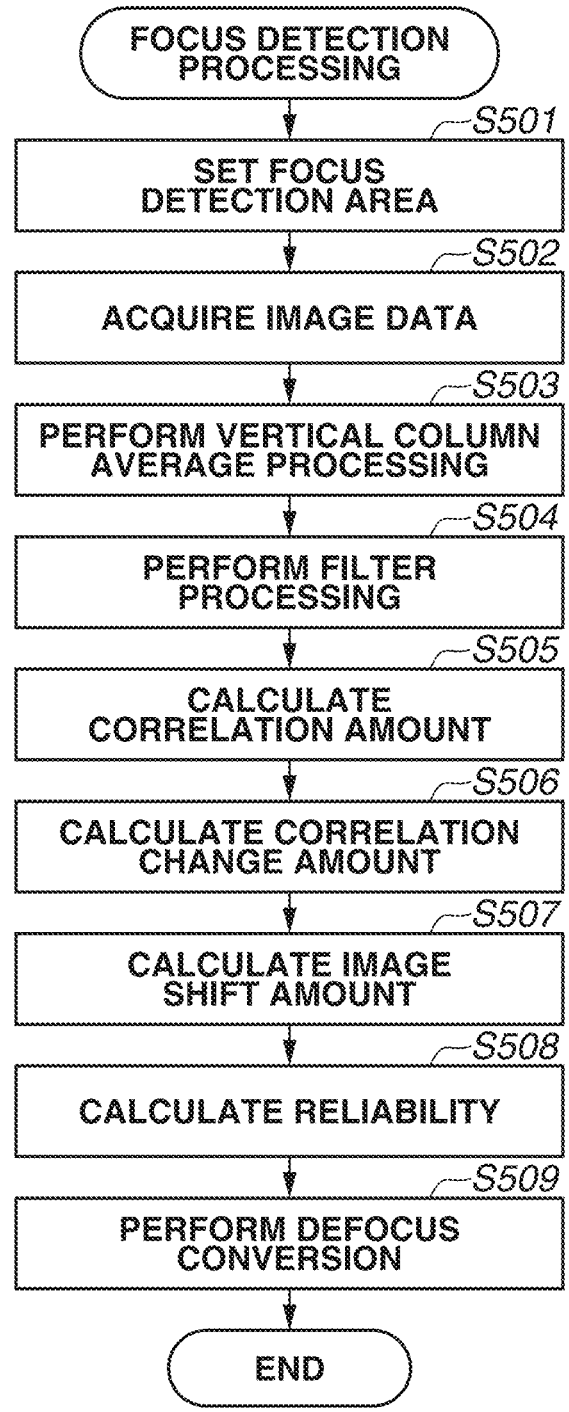
FIG. 8 is a flowchart illustrating focus detection processing according to the exemplary embodiment of the disclosure.

The second obstacle avoidance processing is performed by using a first focus detection result, a second focus detection result, and a third focus detection result that are obtained by extracting signal frequency bands of a first frequency band, a second frequency band, and a third frequency band by the filter processing in step S504 of FIG. 8 in the focus detection processing in step S401 of FIG. 7, and by performing the focus detection processing on each of the signal frequency bands. The first frequency band is a frequency band used for normal focus detection and is set to a high frequency band. The second frequency band is a frequency band used for second obstacle determination in step S2003 described below and for an object having a large defocus amount, and is set to a low frequency band. The third frequency band is a frequency band used in a case where it is determined that an obstacle is present in the second obstacle determination in step S2003. The third frequency band is set to a low frequency band as possible as possible so as not to be influenced by an obstacle, within a signal frequency band securing focus detection accuracy, and is lower than the first frequency band and higher than the second frequency band.

A procedure of the second obstacle avoidance processing according to the present exemplary embodiment is described.

Figure 12:
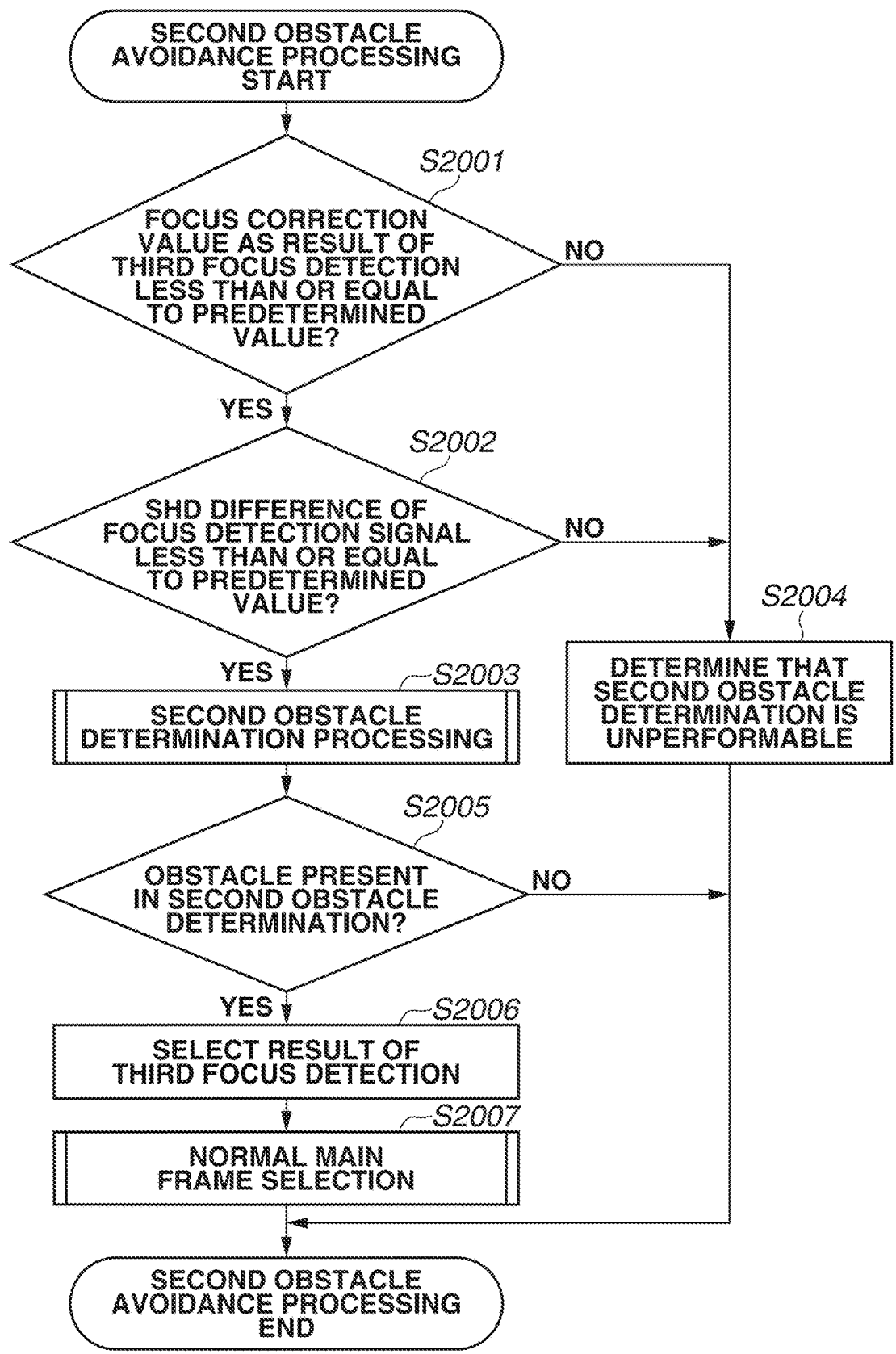
FIG. 12 is a flowchart illustrating second obstacle avoidance processing according to the exemplary embodiment of the disclosure.

FIG. 12 is a flowchart of the second obstacle avoidance processing. Operations in FIG. 12 is performed by the system control unit 209.

In step S2001 of FIG. 12, the system control unit 209 (focus detection accuracy determination unit) determines whether a focus correction value of the third focus detection result is less than or equal to a predetermined value. In a case where the focus correction value is less than or equal to the predetermined value (YES in step S2001), the processing proceeds to step S2002. In a case where the focus correction value is greater than the predetermined value (NO in step S2001), the processing proceeds to step S2004. In step S2004, the detected defocus amount is not selected in the processing, and it is determined that the second obstacle determination is unperformable. The second obstacle avoidance processing then ends.

The focus correction value is a value to correct an optimum image plane position difference for each of the signal frequency bands caused by spherical aberration of a lens. In a case where there is a difference between a frequency band of the image capturing signal and a frequency band of the focus detection signals, the focus correction value is used to correct the focus position detected by the focus detection signals. Typically, a design value of the optimum image plane position difference between the frequency band of the image capturing signal and the frequency band of the focus detection signals is stored as the correction value to perform correction; however, in a case where the lens is individually varied, spherical aberration is varied, and the variation causes a correction error. The correction error is increased as the correction value is increased. Thus, it is not desirable to perform the focus detection under the condition that the correction value is increased.

Accordingly, the obstacle determination is performed in the case where, in this step, the focus correction value of the third focus detection result selected when it is determined that an obstacle is present is small. In the case where the focus correction value is large, it is determined that the obstacle determination is unperformable, and the normal focus detection operation is performed.

Next, in step S2002, the system control unit 209 (focus detection accuracy determination unit) determines whether a shading (SHD) difference between the focus detection signals (A image and B image) acquired in step S502 of the focus detection processing in step S401 is less than or equal to a predetermined value. In a case where the SHD difference is less than or equal to the predetermined value (YES in step S2002), the processing proceeds to step S2003. In a case where the SHD difference is greater than the predetermined value (NO in step S2002), the processing proceeds to step S2004. In step S2004, it is determined that the second obstacle determination is unperformable, and the detected defocus amount is not selected in the processing. The second obstacle avoidance processing then ends. The SHD difference is a difference in a level and an inclination between the A image and the B image.

In a case where the SHD difference is large, shapes of the A image and the B image are different, and a focus detection error caused by the shape difference occurs. In particular, when the filter processing is performed in the low frequency band, the filter processing is easily influenced by the SHD difference because components of the level and the inclination largely remain. The third frequency band selected when it is determined that an obstacle is present is set to the low frequency band so as not to be influenced by the obstacle. Thus, the third frequency band is easily influenced by the SHD difference.

For this reason, the obstacle determination is performed in the case where, in this step, the SHD difference is small and accuracy of the third focus detection result is not lowered. In a case where the SHD difference is large, it is determined that the obstacle determination is unperformable, and the normal focus detection operation is performed.

Next, in step S2003, the system control unit 209 (obstacle determination unit) performs the second obstacle determination. The details of the second obstacle determination are described below.

Next, in a case where it is determined in step S2005 that an obstacle is present based on the result of the determination in step S2003 (YES in step S2005), the processing proceeds to step S2006. In a case where it is determined in step S2005 that an obstacle is absent (NO in step S2005), the detected defocus amount is not selected in the processing, and the second obstacle avoidance processing ends. In step S2006, the third focus detection result is selected as the detected defocus amount. The processing then proceeds to step S2007. In step S2007, the normal main frame selection described below is performed. The processing then ends.

<Second Obstacle Determination Processing>

A procedure of the second obstacle determination processing according to the present exemplary embodiment is described.

Figure 13:
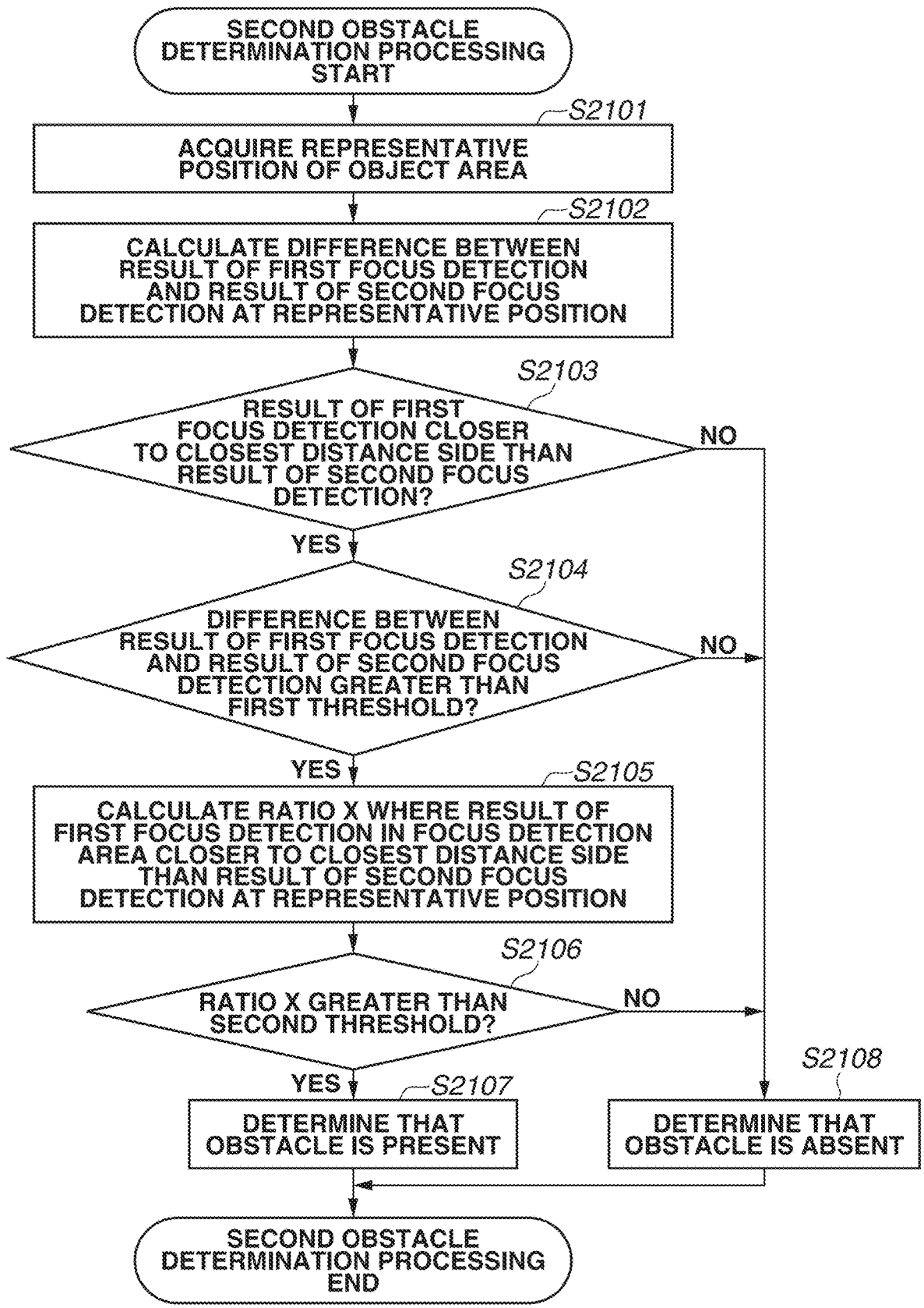
FIG. 13 is a flowchart illustrating second obstacle determination processing according to the exemplary embodiment of the disclosure.

FIG. 13 is a flowchart of the second obstacle determination processing. Operations in FIG. 13 is performed by the system control unit 209 (obstacle determination unit).

Figure 14:
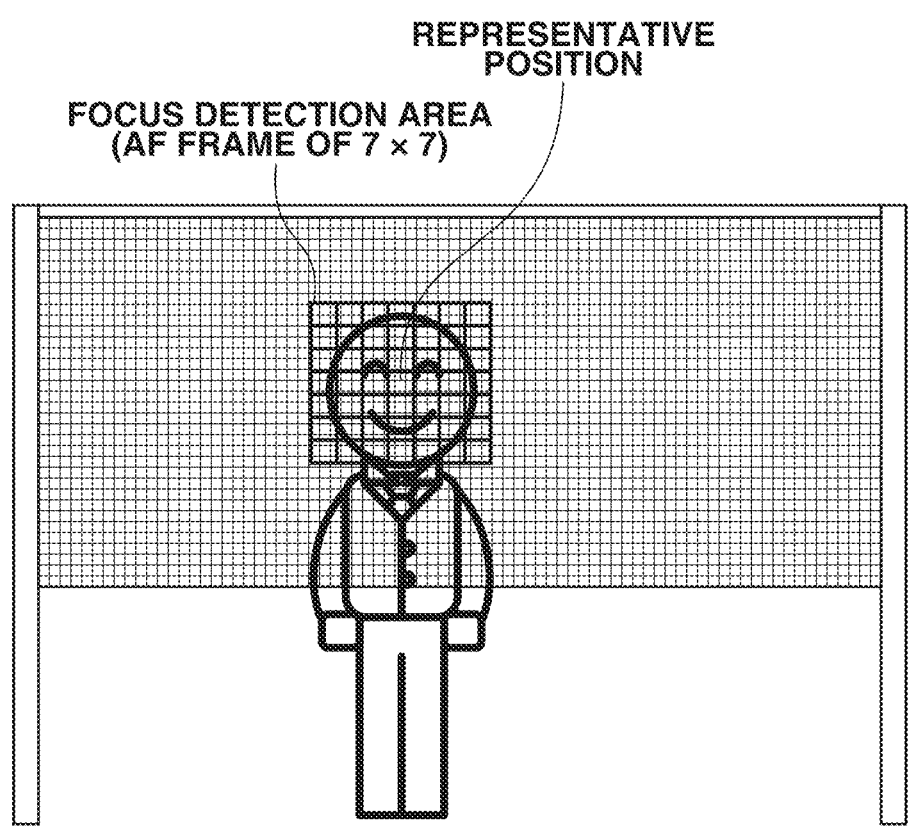
FIG. 14 is a schematic diagram illustrating a state where a second obstacle is present in front of an object, according to the exemplary embodiment of the disclosure.

In step S2101 of FIG. 13, the system control unit 209 acquires a center position of the object area acquired in step S301 of FIG. 3, as a representative position. FIG. 14 is a schematic view illustrating a state where an obstacle is present in front of the object, and illustrates a state where a net as the obstacle is present on a front side (closest distance side) of a face of a person. As illustrated in FIG. 14, the focus detection area is set to the detected object area, and a center position of the detected object area is defined as the representative position. Although the center position of the object area is acquired as the representative position in the present exemplary embodiment, the representative position is not limited thereto. The second focus detection result of the object area may be classified, and a position closest to a center in an area belonging to a most frequent class may be defined as the representative position.

Next, in step S2102, the system control unit 209 calculates a difference between the first focus detection result and the second focus detection result at the representative position acquired in step S2101. In a case where both of the face and the net are present in one AF frame as illustrated in FIG. 14, signals of both of the face and the net are mixed. Accordingly, the focus detection result is different depending on a signal frequency band used for the focus detection, and a position of not the face but the net, or a position between the face and the net may be detected.

Figure 15A:
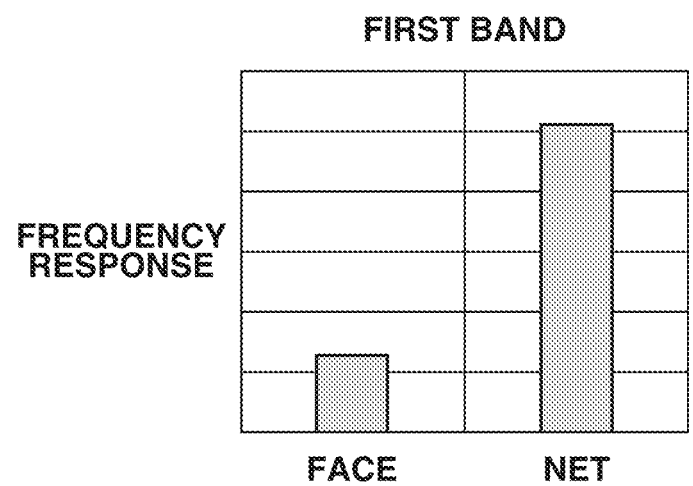
FIGS. 15A and 15B are diagrams respectively illustrating a frequency response of each of a face and a net in a first frequency band and that in a second frequency band, according to the exemplary embodiment of the disclosure.
Figure 15B:
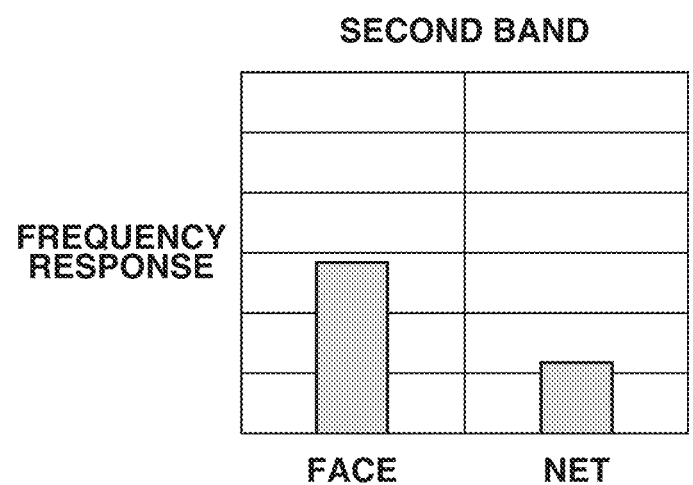

FIGS. 15A and 15B illustrate responses of the face and the net in the frequency bands. FIG. 15A illustrates frequency responses of the face and the net in the first frequency band, and FIG. 15B illustrates frequency responses of the face and the net in the second frequency band. As illustrated in FIG. 15A, in the first frequency band as the high frequency band, the response of the net is higher than the response of the face. As illustrated in FIG. 15B, in the second frequency band as the low frequency band, the response of the face is higher than the response of the net. Accordingly, in the first frequency band, the focus position of the net is detected as the first focus detection result because the response of the net is higher, and in the second frequency band, the focus position of the face is detected as the second focus detection result because the response of the face is higher.

As described above, there is a high possibility that, in the case where the focus detection result is varied depending on the frequency band, the object and the obstacle are present together in the AF frame, and in particular, in a case where the focus detection result of the high frequency band represents the closest distance side more than the focus detection result of the low frequency band, the obstacle such as the net that is the object of the high frequency band is overlapped in front of the object such as the face. The obstacle determination is performed in steps S2103 to S2105 by using the relationship.

In step S2103, in a case where the difference calculated in step S2102 indicates that the first focus detection result is on the closest distance side more than the second focus detection result (YES in step S2103), the system control unit 209 determines that the obstacle is present with high possibility, and the processing proceeds to step S2104. In a case where the difference calculated in step S2102 indicates that the first focus detection result is on an infinite side more than the second focus detection result (NO in step S2103), the processing proceeds to step S2108. In step S2108, it is determined that an obstacle is not present, and the second obstacle determination then ends. At this time, in a case where the first focus detection result easily detecting the focus position of the high-frequency band obstacle such as the net is on the closest distance side more than the second focus detection result of the low frequency band, it is determined that the obstacle such as the net is overlapped in front of the object such as the face with high possibility.

Next, in step S2104, in a case where the difference calculated in step S2102 is greater than a first threshold (YES in step S2104), the system control unit 209 determines that an obstacle is present with high possibility, and the processing proceeds to step S2105. In a case where the difference is less than or equal to the first threshold (NO in step S2104), the processing proceeds to step S2108. In step S2108, it is determined that an obstacle is not present, and the second obstacle determination ends. At this time, to consider variation of the focus detection result, the first threshold is set as a range where the focus detection result may be varied, and in the case where the difference is greater than or equal to the first threshold, it is determined that it is not caused by the varied detection result and an obstacle is overlapped with the object with high possibility.

Next, in step S2105, the system control unit 209 calculates a ratio X where the first the first focus detection result within the focus detection area is on the closest distance side more than the second focus detection result at the representative position.

Next, in step S2106, in a case where the ratio X calculated in step S2105 is greater than a second threshold (YES in step S2106), the processing proceeds to step S2107. In step S2107, the system control unit 209 determines that an obstacle is present, and the second obstacle determination ends. In a case where the ratio X is less than or equal to the second threshold (NO in step S2106), the processing proceeds to step S2108. In step S2108, it is determined that an obstacle is not present, and the second obstacle determination ends. At this time, the determination is performed based on whether the first focus detection result of the high frequency band that detects the closest distance side more than the second focus detection result of the low frequency band spreads to a sufficiently wide range. The high-frequency band obstacle such as the net spreads to a wider range than the object such as the face, with high possibility. For this reason, when the first focus detection result of the high frequency band represents the closest distance side in a wide range of the focus detection area, it is determined that the obstacle such as the net spreads in front of the object such as the face with high possibility.

In the present exemplary embodiment, the object area is defined as the face area detected by the object detection unit; however, the object area is not limited thereto, and the object area may be defined as an area of the other detected object. Further, detection types may be previously classified into a high-frequency group and a low-frequency group, and the second obstacle avoidance processing may be performed on an object in the low-frequency group.

Further, in the present exemplary embodiment, the focus detection area is set to the object area; however, the focus detection area may be set to an area wider than the object area with the object area as a reference, and the focus detection result of the first frequency band may be calculated in an area outside the object area.

<Normal Detected Defocus Amount Calculation>

Figure 16:
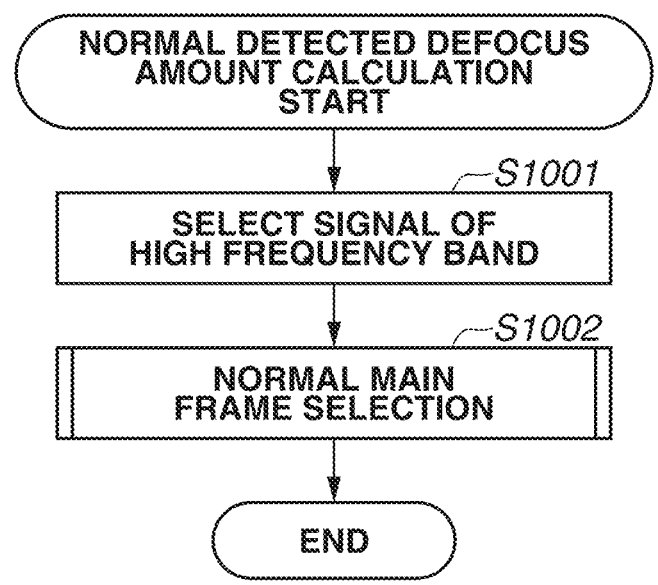
FIG. 16 is a flowchart illustrating a normal detected defocus amount calculation method according to the exemplary embodiment of the disclosure.

The normal detected defocus amount calculation in step S605 is described with reference to FIG. 16. First, in a case where the focus detection is performed on the signals of the plurality of frequency bands by the processing in step S509, the defocus amount detected in the signal of the highest frequency band is set to be used in step S1001. The processing then proceeds to step S1002. In step S1002, normal main frame selection described below is performed. The normal detected defocus amount calculation then ends.

<Normal Main Frame Selection>

Figure 17:
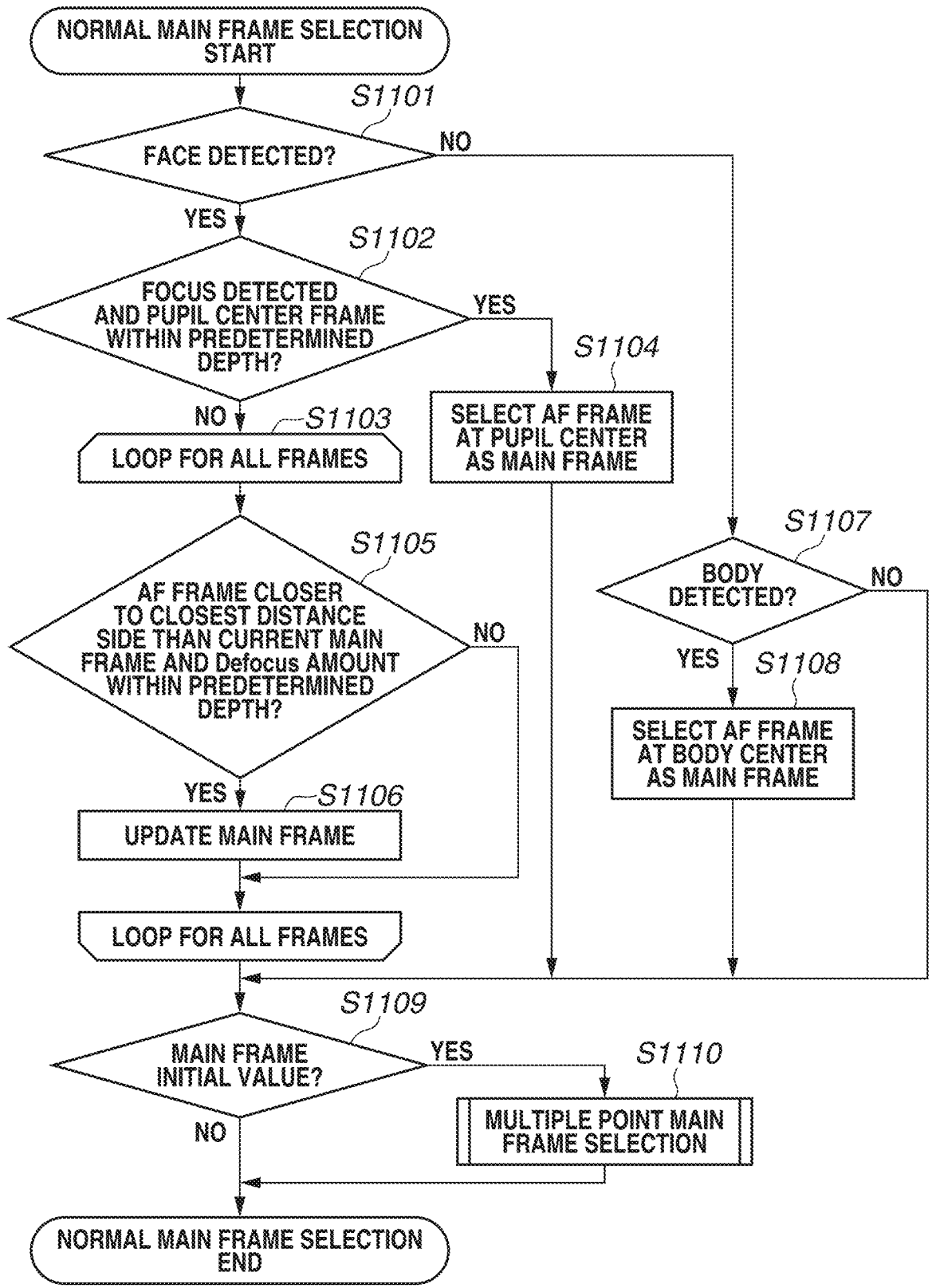
FIG. 17 is a flowchart illustrating a normal main frame selection method according to the exemplary embodiment of the disclosure.

The normal main frame selection in steps S726, S2007, and S1002 is described with reference to FIG. 17. First, in step S1101, it is determined whether the face of the object has been detected by the object detection unit 211. In a case where the face has been detected (YES in step S1101), the processing proceeds to step S1102. In a case where the face has not been detected (NO in step S1101), the processing proceeds to step S1107. In step S1107, it is determined whether the body of the object has been detected by the object detection unit 211. In a case where the body has been detected (YES in step S1107), the processing proceeds to step S1108. In a case where the body has not been detected (NO in step S1107), the processing proceeds to step S1109.

In step S1102, it is determined whether the pupil has been detected and the AF frame at the pupil center is within a predetermined depth from the focus lens position when the defocus amount is calculated. Typically, the object detection information is high in accuracy in the in-focus state. In a case where the defocus amount is greater than or equal to the predetermined depth, there is a possibility that the object detection information is erroneously detected. Thus, the above-described predetermined condition is used. In a case where the pupil has been detected and the AF frame at the pupil center is within the predetermined depth (YES in step S1102), the processing proceeds to step S1104. In step S1104, the AF frame at the pupil center is set as the main frame. Otherwise (NO in step S1102), the processing proceeds to step S1103.

In step S1103, to select the main frame from the set AF frames, processing in step S1105 performed on one AF frame of interest is performed on all of the set AF frames in a loop manner. Further, as the initial value of the main frame, information (e.g., number of all frames+1) indicating that no main frame is selected is previously set, and illustration thereof is omitted. In step S1105, it is determined whether the AF frame of interest is on the closest distance side more than the selected main frame and whether the defocus amount is within the predetermined depth. In a case where the conditions have been satisfied (YES in step S1105), the AF frame of interest is set as the main frame in step S1106.

In step S1109, it is determined whether the main frame has been selected in the above-described flowchart, by determining whether the main frame is the initial value. In a case where the main frame is the initial value (YES in step S1109), the processing proceeds to step S1110. Otherwise (NO in step S1109), the main frame selection processing ends. In step S1110, a main frame may be selected in a predetermined area of a screen without using the detected information. However, not a main technique of the present disclosure, and a detailed description thereof is omitted.

In a case where a defocus amount difference is not greater than or equal to a predetermined value in the object area, the processing may proceed to step S1110, and the main frame may be selected in a predetermined area of a screen. Further, in the main frame selection, the main frame to be selected may be changed depending on whether a mode is a stationary object capturing mode or a moving object capturing mode. More specifically, in a case of the stationary object capturing mode, the main frame is determined based on the information about the above-described detection area. In the case of the moving object capturing mode, the main frame is determined based on the past focus detection information.

Figure 11:
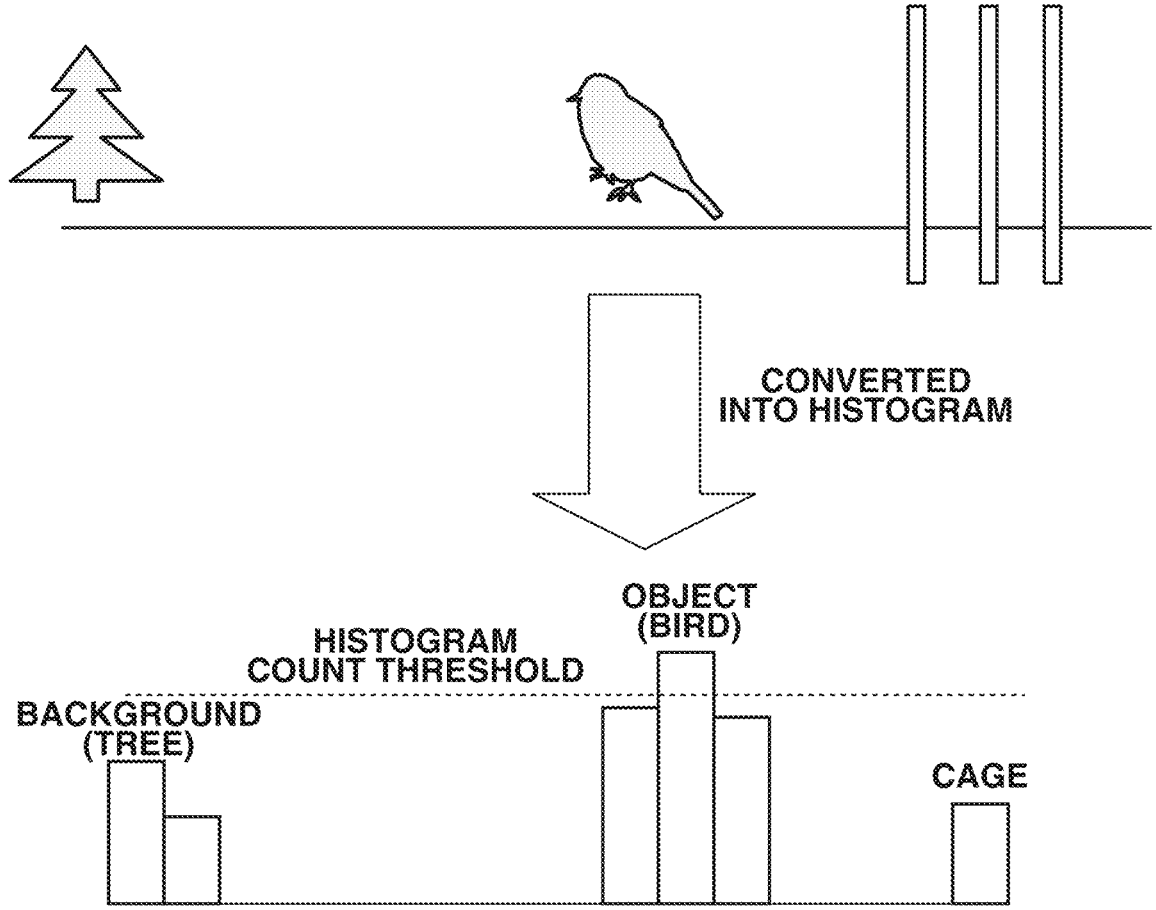
FIG. 11 is a conceptual diagram of a histogram according to the exemplary embodiment of the disclosure.

Applying the present exemplary embodiment makes it possible to suitably identify a scene where an object different in distance is present together with the main object. In addition, even in a case where an object different in distance is present together with a main object, it is possible to perform suitable focus detection operation. It is possible to reduce, for example, a phenomenon in which a cage is in focus under environment where a wild bird is kept inside the cage in a zoo. FIG. 11 illustrates a conceptual diagram of a histogram under the above-described environment. Further, for example, when an image of a sport scene is captured through a net, it is possible to reduce a phenomenon in which the net is in focus.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-076086, filed Apr. 22, 2020, and Japanese Patent Application No. 2021-023441, filed Feb. 17, 2021, all of which are hereby incorporated by reference herein in its entirety.

What is claimed is:

1. A device, comprising:
at least one processor; and
a memory coupled to the at least one processor storing instructions that, when executed by the processor, cause the processor to function as:
a focus detection unit configured to detect a defocus amount based on a focus detection signal output from an image capturing device;
an object detection unit configured to detect a specific object based on image data output from the image capturing device; and
a processing unit configured to perform first obstacle detection processing detecting an obstacle to the specific object based on characteristics of the defocus amount, and to perform second obstacle detection processing detecting an obstacle higher in spatial frequency than the specific object.

2. The device according to claim 1,
wherein a type of the specific object is one of a plurality of types of objects, and
wherein the object detection unit also detects the type of the specific object.

3. The device according to claim 2, wherein the processing unit omits, in a case where the type of the specific object is a first object type, the first obstacle detection processing.

4. The device according to claim 3, wherein the first object type is a person.

5. The device according to claim 2, wherein the processing unit omits, in a case where the type of the specific object is a second object type, the second obstacle detection processing.

6. The device according to claim 4, wherein the second object type is an animal.

7. The device according to claim 2, wherein the processing unit omits, in a case where the type of the object is a third object type, the first and second obstacle detection processings.

8. The device according to claim 5, wherein the third object type is neither a person nor an animal.

9. The device according to claim 1, further comprising a setting unit configured to set a plurality of focus detection areas corresponding to areas of the detected specific object,
wherein the first obstacle detection processing is processing to detect whether an obstacle is present, based on a defocus amount corresponding to the plurality of focus detection areas or a histogram of an object distance.

10. The device according to claim 1, further comprising an extraction unit configured to extract signals of different frequency bands,
wherein the extraction unit extracts a first signal of a first frequency band and a second signal of a second frequency band lower in frequency than the first frequency band,
wherein the focus detection unit outputs a first focus detection result obtained based on the first signal and a second focus detection result obtained based on the second signal, of focus detection areas set with reference to the specific object, and
wherein an obstacle is determined to be present in the second obstacle detection processing, in a case where the first focus detection result is on a closest distance side more than the second focus detection result.

11. The device according to claim 1, further comprising an adjustment unit configured to adjust a focus state of an optical system based on an output of the detection unit.

12. An apparatus, comprising:
the device according to claim 1; and
an image capturing device configured to photoelectrically convert light fluxes passing through different pupil areas of an image capturing optical system, and to output a focus detection signal.

13. A device, comprising:
at least one processor; and
a memory coupled to the at least one processor storing instructions that, when executed by the processor, cause the processor to function as:
an object detection unit configured to detect object areas from an acquired image;
a setting unit configured to a set a plurality of focus detection areas corresponding to the detected object areas;
a focus detection unit configured to detect focus detection information on each of the plurality of focus detection areas; and
an adjustment unit configured to determine an area to be focused based on information on a result obtained by dividing a plurality of pieces of the focus detection information corresponding to the plurality of focus detection areas into a plurality of groups, counting a number of the pieces of focus detection information in each of the groups, and determining in which of the groups the counted number is the largest and to adjust focus.

14. The device according to claim 13, wherein the focus detection information on each of the plurality of focus detection areas is a defocus amount or a predicted value corresponding to an object position calculated based on the defocus amount.

15. The device according to claim 13, wherein the object detection unit detects at least any of a face of a person, a full body of a person, a face of an animal, and a full body of an animal as the object areas.

16. The device according to claim 13, wherein the area to be focused is a main area of an object.

17. The device according to claim 13, wherein the adjustment unit changes a method of determining the area to be focused, depending on whether an object is a stationary object or a moving object.

18. The device according to claim 17, wherein the adjustment unit determines the area to be focused, in a case where the object is the stationary object, based on information on the number of focused areas, and the adjustment unit determines the area to be focused, in a case where the object is the moving object, based on past focus detection information.

19. The device according to claim 13, wherein the adjustment unit changes a method of determining the area to be focused depending on whether a mode is a stationary object capturing mode or a moving object capturing mode.

20. The device according to claim 19, wherein the adjustment unit determines the area to be focused in a case of the stationary object capturing mode, based on the counted number, and the adjustment unit determines the area to be focused, in a case of the moving object capturing mode, based on past focus detection information.

21. The device according to claim 13, wherein, in a case where a group in which the counted number is the largest is not on a closest distance side, the adjustment unit determined that an obstacle is present.

22. The device according to claim 13, wherein, in a case where a group in which the counted number is the largest is not on a closest distance side, the adjustment unit determines, from the group in which the counted number is the largest, an area which is closer to a center of a main area of an object as the area to be focused and adjusts the focus.

23. The device according to claim 13, wherein, in a case where a group in which the counted number is the largest is on a closest distance side, the adjustment unit determines the area to be focused in preference to the closest distance side and adjusts the focus.

24. A device, comprising:
at least one processor; and
a memory coupled to the at least one processor storing instructions that, when executed by the processor, cause the processor to function as:
an extraction unit configured to extract signals of different frequency bands;
a focus detection unit configured to perform focus detection by using the signals;
an object detection unit configured to detect object areas;
a determination unit configured to determine presence/absence of an obstacle; and
an adjustment unit configured to adjust focus based on a result of the focus detection,
wherein the extraction unit extracts a first signal of a first frequency band, a second signal of a second frequency band lower in frequency than the first frequency band, and a third signal of a third frequency band lower in frequency than the first frequency band,
wherein the focus detection unit outputs a first focus detection result obtained based on the first signal, a second focus detection result obtained based on the second signal, and a third focus detection result obtained based on the third signal, of focus detection areas set with reference to the object areas,
wherein the determination unit determines that, in a case where the first focus detection result is on a closest distance side more than the second focus detection result, an obstacle is present, and
wherein the adjustment unit adjusts focus, in a case where the determination unit determines that an obstacle is present, based on the third focus detection result.

25. The device according to claim 20, wherein the third frequency band is higher in frequency than the second frequency band.

26. The device according to claim 20, further comprising a focus detection accuracy determination unit configured to determine detection accuracy of the third focus detection result,
wherein the focus detection accuracy determination unit determines that the detection accuracy of the third focus detection result is low when a difference between an optimum image plane position of a frequency band of an image capturing signal and an optimum image plane position of the third frequency band is large or when a shading difference between the first focus detection signal and the second focus detection signal is large, and
wherein the adjustment unit adjusts focus, in a case where the focus detection accuracy determination unit determines that the detection accuracy of the third focus detection result is low, based on the first focus detection result.

27. The device according to claim 24, wherein the focus detection unit sets the focus detection area for the first frequency band wider than the focus detection area for the second frequency band.

28. The device according to claim 20,
wherein the object detection unit detects an object type, and
wherein the adjustment unit adjusts focus, in a case where the object type is a high-frequency band object, based on the first focus detection result.

29. A method, comprising:
detecting a defocus amount based on a focus detection signal output from an image capturing device;
detecting a specific object based on image data output from the image capturing device; and
performing first obstacle detection processing to detect an obstacle based on characteristics of the defocus amount on the specific object and second obstacle detection processing to detect an obstacle higher in spatial frequency than the specific object.

30. A method, comprising:
detecting object areas from an acquired image;
setting a plurality of focus detection areas corresponding to the detected object areas;
detecting focus detection information on each of the plurality of focus detection areas; and
determining an area to be focused based on a result obtained by dividing a plurality of pieces of the focus detection information corresponding to the plurality of focus detection areas into a plurality of groups, counting a number of the pieces of focus detection information in each of the groups, and determining in which of the groups the counted number is the largest, and adjusting focus.

31. A method, comprising:
extracting signals of different frequency bands;
performing focus detection by using the signals;
detecting object areas;
determining presence/absence of an obstacle; and
adjusting focus based on a result of the focus detection,
wherein a first signal of a first frequency band, a second signal of a second frequency band lower in frequency than the first frequency band, and a third signal of a third frequency band lower in frequency than the first frequency band are extracted in the extracting the signals,
wherein a first focus detection result obtained based on the first signal, a second focus detection result obtained based on the second signal, and a third focus detection result obtained based on the third signal, of focus detection areas set with reference to the object areas are output in the performing the focus detection,
wherein it is determined in the determining, in a case where the first focus detection result is on a closest distance side more than the second focus detection result, that an obstacle is present, and wherein the the adjusting focus is performed, in a case where presence of an obstacle is detected, based on the third focus detection result.

32. A device, comprising:
at least one processor or circuit configured to function as the following units:
an extraction unit configured to extract signals of different frequency bands;
a focus detection unit configured to perform focus detection by using the signals;
an object detection unit configured to detect object areas; and
an adjustment unit configured to adjust focus based on a result of the focus detection,
wherein the extraction unit extracts a first signal of a first frequency band and a second signal of a second frequency band lower in frequency than the first frequency band,
wherein the focus detection unit outputs a first focus detection result obtained based on the first signal and a second focus detection result obtained based on the second signal, of focus detection areas set with reference to the object areas, and
wherein the focus detection unit adjusts focus without using the first focus detection result in a case where the first focus detection result is on a closest distance side more than the second focus detection result.

* * * * *